(12) United States Patent
Harms et al.

(10) Patent No.: US 10,982,896 B2
(45) Date of Patent: Apr. 20, 2021

(54) METHOD FOR A PRESSURE-BASED DETERMINING OF A PRODUCT PARAMETER IN A FREEZE DRYER, FREEZE DRYER AND SOFTWARE PRODUCT

(71) Applicant: Martin Christ Gefriertrocknungsanlagen GmbH, Osterode (DE)

(72) Inventors: Frank Harms, Osterode am Harz (DE); Michael Ebert, Osterode am Harz (DE); Sven Ostermeier, Bad Grund (DE)

(73) Assignee: MARTIN CHRIST GEFRIERTROCKNUNGSANLAGEN GMBH, Osterode (DE)

( * ) Notice: Subject to any disclaimer, the term of this patent is extended or adjusted under 35 U.S.C. 154(b) by 316 days.

(21) Appl. No.: 16/162,579

(22) Filed: Oct. 17, 2018

(65) Prior Publication Data

US 2019/0120535 A1   Apr. 25, 2019

(30) Foreign Application Priority Data

Oct. 20, 2017   (EP) ..................................... 17197514

(51) Int. Cl.
F25D 17/04 (2006.01)
F26B 5/06 (2006.01)
(Continued)

(52) U.S. Cl.
CPC ............ F25D 17/047 (2013.01); F25D 29/00 (2013.01); F26B 5/06 (2013.01); G06F 17/18 (2013.01); *F25B 2700/19* (2013.01)

(58) Field of Classification Search
CPC .......... F25D 17/047; F25D 29/00; F26B 5/06; G06F 17/18; F25B 2700/19
See application file for complete search history.

(56) References Cited

U.S. PATENT DOCUMENTS 6,971,187 B1   12/2005   Pikal et al.
8,820,516 B2   9/2014   Christ
(Continued)

FOREIGN PATENT DOCUMENTS

DE         1 038 988 B   2/1959
DE    10 2006 019 641 B4   8/2013
(Continued)

OTHER PUBLICATIONS

Milton, N., et al., Evaluation of manometric temperature measurement as a method of monitoring product temperature during lyophilization. PDA Journal of Pharmaceutical Science and Technology, 1997. 51(1): S. 7-16.
(Continued)

*Primary Examiner* — Mohammad K Islam
(74) *Attorney, Agent, or Firm* — Thomas | Horstemeyer, LLP

(57) ABSTRACT

Methods are disclosed for the pressure-based determining of a product parameter in a freeze dryer, in particular a product temperature. At a point in time $t_{START}$, a closing element as an intermediate valve between an ice chamber and a drying chamber of the freeze dryer is closed. Then, during a pressure rise occurring due to the sublimation pressure values ($P_1$, $P_2$, . . . ) are measured in the drying chamber. At a point in time $t_{END}$ then the closing element is opened. From the measured pressure values ($P_1$, $P_2$, . . . ) an approximation of a product parameter, in particular a product temperature $T_{APPROX}$, is determined. The point in time $t_{END}$ is determined specifically for the measured pressure values ($P_1$, $P_2$, . . . ) such that the time span for which the closing element is closed depends on the determined pressure values and such that the time span is variable during a drying process.

17 Claims, 14 Drawing Sheets

(51) Int. Cl.
  *G06F 17/18* (2006.01)
  *F25D 29/00* (2006.01)

(56) References Cited

U.S. PATENT DOCUMENTS

| | | | | |
|---|---|---|---|---|
| 9,347,707 | B2* | 5/2016 | Struschka | F26B 5/065 |
| 9,920,989 | B2* | 3/2018 | Luy | F26B 5/065 |
| 10,451,345 | B2* | 10/2019 | Gebhard | F26B 11/026 |
| 10,527,350 | B2* | 1/2020 | Plitzko | F26B 25/002 |
| 2003/0116027 | A1* | 6/2003 | Brulls | F26B 5/06 |
| | | | | 99/279 |
| 2008/0172902 | A1 | 7/2008 | Gruber et al. | |
| 2010/0070240 | A1* | 3/2010 | Yasuda | G01F 1/50 |
| | | | | 702/183 |
| 2010/0242301 | A1* | 9/2010 | Rampersad | F26B 5/06 |
| | | | | 34/285 |
| 2010/0313441 | A1* | 12/2010 | McLaren | A61L 2/24 |
| | | | | 34/403 |
| 2016/0265844 | A1* | 9/2016 | Jo Cardoso | F26B 5/06 |
| 2018/0071415 | A1* | 3/2018 | Dern | A61L 2/07 |
| 2018/0073806 | A1* | 3/2018 | Dern | A23L 3/44 |
| 2019/0195556 | A1* | 6/2019 | Capeder | F26B 9/06 |

FOREIGN PATENT DOCUMENTS

| | | |
|---|---|---|
| EP | 1 903 291 A1 | 3/2008 |
| EP | 2 488 808 B1 | 10/2010 |
| EP | 2 156 124 B1 | 4/2012 |
| EP | 2 773 913 B1 | 11/2012 |
| EP | 3 093 597 A1 | 5/2015 |

OTHER PUBLICATIONS

Tang, X.L., S.L. Nail, and M.J. Pikal, Evaluation of manometric temperature measurement, a process analytical technology tool for freeze-drying: Part I, product temperature measurement. Aaps Pharmscitech, 2006. 7(1).

Tang, X.L.C., S.L. Nail, and M.J. Pikal, Evaluation of manometric temperature measurement, a process analytical technology tool for freeze-drying: Part II Measurement of dry-layer resistance. Aaps Pharmscitech, 2006. 7(4).

Tang, X.L.C., S.L. Nail, and M.J. Pikal, Evaluation of manometric temperature measurement (MTM), a process analytical technology tool in freeze drying, Part III: Heat and mass transfer measurement. Aaps Pharmscitech, 2006. 7(4).

Gieseler, H., T. Kramer, and M.J. Pikal, Use of manometric temperature measurement (MTM) and SMART (TM) freeze dryer technology for development of an optimized freeze-drying cycle. Journal of Pharmaceutical Sciences, 2007. 96(12): S. 3402-3418.

Buck, A. L. (1996). Buck Research Manual (updated equation). National Center for Atmospheric Research.

Tang, X.L., S.L. Nail, and M.J. Pikal, Freeze-drying process design by manometric temperature measurement: Design of a smart freeze-dryer. Pharmaceutical Research, 2005. 22(4): S. 685-700.

Buck, A. L. (1981). New equations for computing vapor pressure and enhancement factor. National Center for Atmospheric Research.

* cited by examiner

METHOD FOR A PRESSURE-BASED DETERMINING OF A PRODUCT PARAMETER IN A FREEZE DRYER, FREEZE DRYER AND SOFTWARE PRODUCT

CROSS REFERENCE TO RELATED APPLICATIONS

This application claims priority to co-pending European Patent Application No. EP 17 197 514.7 filed Oct. 20, 2017.

FIELD OF THE INVENTION

The invention relates to a method for the pressure-based determining of a product parameter in a freeze dryer. Furthermore, the invention relates to a freeze dryer as well as a software product which might e.g. be a machine-readable storage medium, a portable data carrier, a hard disc or a database.

BACKGROUND OF THE INVENTION

During freeze drying in common freeze dryers the product temperature (in particular the temperature of the drying good in the region of a sublimation front of the drying good during the main drying process and/or during a post drying process) is an important parameter for controlling and evaluating the freeze drying process.

Commonly temperature sensors are used for measuring the product temperature. Common temperature sensors are wirelessly or wire-based supplied with power and transmit the measurement signal wirelessly or wire-based. These temperature sensors can be arranged in some of the drying vessels in a drying chamber of the freeze dryer. In this way, it is possible to selectively measure single temperatures in these drying vessels (as much as possible representatively for all of the drying vessels arranged in the drying chamber). However, in some cases the temperature sensors already change the process conditions in the drying vessels when compared to the drying vessels wherein no temperature sensor is arranged. It is e.g. possible that there is a changed crystallization behavior due to the presence of the sensor in the drying vessel. Furthermore, the temperature sensors measure the temperature in the drying vessel at a specific measurement position which (dependent on the position of the temperature sensor and/or the progression of the drying process) can be arranged in the region of the frozen drying good or in the region of an already dried so-called cake of the drying good. Accordingly, the temperature sensor does not exactly measure the temperature at the sublimation front. However, when using the temperature sensor in the drying vessel care has to be taken that the measured temperature is representative for the drying process which is only possible to a limited extent. The reason for this is that the temperatures of the drying good in the different drying vessels of a batch might differ from each other. The temperature might e.g. depend on a drying vessel being arranged more internally or more externally in a drying chamber of the freeze dryer.

Alternatively, an indirect measurement of the product temperature via a pressure in the drying chamber is known. For this purpose, a valve between the drying chamber and an ice chamber is closed during the drying process so that in the ideal case the drying chamber forms a closed system. Despite of the closure of the valve the sublimation continues. Due to the fact that because of the closed system the sublimated vapor is neither absorbed by the ice condenser nor removed in another way, the pressure in the drying chamber rises. It is possible to deduce the product temperature at the sublimation front from the pressure rise in the drying chamber.

A pressure-based indirect determination of the product temperature is proposed in the patent publication DE 1 038 988 B. In the patent publication at first the two drying phases in a freeze drying process are explained: in the so-called main drying the ice being present in the drying good sublimates. With continued drying a dried part (so-called cake) of increasing size covers the ice core which becomes smaller. When the ice has completely sublimated, the main drying is finished and a post drying follows. During the post drying a removal of the solvent which is bound in an absorptive way results in the desired further reduced residual humidity which might e.g. defined by the desired expiration term of the drying good and/or which might depend on the type of drying good. Then, the patent publication describes that for a good result of the freeze drying process it is important to maintain predefined temperature limits: during the main drying the temperature of the ice core should not exceed a specific value which in the most cases is considerably below 0° C. This is the case because otherwise the properties of the drying good strived for after the drying process cannot be provided. On this background the patent publication describes the conflict of objectives that on the one hand from the before mentioned reason the lowest possible temperature should be chosen whereas on the other hand due to the physical principles the freeze drying process might be run through in a faster way the higher the temperature of the drying good is and the larger the temperature dependent vapor pressure difference between the drying good and the surface of the ice condenser is. For the optimized solution of the conflict of objectives accordingly the largest possible pressure difference between the drying good and the ice condenser surface has to be provided which means that the drying good should be held as close as possible to the admissible temperature limit at which its inner core embedded into ice is not damaged. On this background the patent publication DE 1 038 988 B proposes that during the main drying the drying chamber is repeatedly (almost or at least for 90% with respect to the stream of water vapor) closed for a predefined time duration (preferably in the region of 2 to 10 seconds) by a closing means. At the end of the closing time the pressure in the chamber is measured which should then be nearly the same as the saturation vapor pressure of the ice included in the drying good. Due to the temperature of the ice determined from the pressure measurement with the help of the known vapor pressure curve over ice, it is then possible to control the temperature during the freeze drying process in a way such that as much as possible the product temperature does not exceed the admissible limit where the core of the drying good still included into ice is not damaged. A transition from the main drying to the post drying should then be detected if the measurement of the pressure leads to the result that after the closing the measured saturation vapor pressure remains approximately constant. Then, during the post drying after a longer predetermined closing time of e.g. 2 minutes the residual humidity of the drying good can be determined from the then establishing saturation vapor pressure on the basis of the known sorption isotherms. The patent publication proposes a correction of any defect values on the basis of correction measures not further specified wherein as one error source an unavoidable leakage of the drying chamber is mentioned.

It has shown that the influence of the product temperature and any remaining leakage of the drying chamber during the freeze drying process and during the temporarily (almost) closed drying chamber in a complex way influence the pressure rise. Furthermore, other influencing parameters as a heat input by a supporting surface on which the drying vessels are arranged and the volume of a dried cake of the drying good covering the ice of the drying good have an influence on the pressure rise. A modeling of these dependencies is e.g. known from Milton, N., et al., *Evaluation of manometric temperature measurement as a method of monitoring product temperature during lyophilization*. PDA Journal of Pharmaceutical Science and Technology, 1997. 51(1): S. 7-16.

Applications of the pressure based determination of the product temperature are e.g. disclosed in Tang, X. L., S. L. Nail, and M. J. Pikal, *Evaluation of manometric temperature measurement, a process analytical technology tool for freeze-drying: Part I, product temperature measurement*. Aaps Pharmscitech, 2006. 7(1), Pikal, M. J., X. Tang, and S. L. Nail, *Automated process control using manometric temperature measurement*. 2005, University of Connecticut; Purdue Research Foundation, Tang, X. L. C., S. L. Nail, and M. J. Pikal, *Evaluation of manometric temperature measurement, a process analytical technology tool for freeze-drying: Part II Measurement of dry-layer resistance*. Aaps Pharmscitech, 2006. 7(4), Tang, X. L. C., S. L. Nail, and M. J. Pikal, *Evaluation of manometric temperature measurement (MTM), a process analytical technology tool in freeze drying, Part III: Heat and mass transfer measurement*. Aaps Pharmscitech, 2006. 7(4), Gieseler, H., T. Kramer, and M. J. Pikal, *Use of manometric temperature measurement (MTM) and SMART (TM) freeze dryer technology for development of an optimized freeze-drying cycle*. Journal of Pharmaceutical Sciences, 2007. 96(12): S. 3402-3418 and Velardi, S. A. and A. A. Barresi, *Method and system for controlling a freeze drying process*, 2008.

In the patent literature, a pressure-based determination of a product temperature during a freeze drying process as well as the use of the product temperature determined in this way for a process control in a freeze dryer is e.g. disclosed in the publications EP 2 156 124 B1, EP 1 903 291 A1 and U.S. Pat. No. 6,971,187 B1.

The publication

Tang, X. L., S. L. Nail, and M. J. Pikal, *Freeze-drying process design by manometric temperature measurement: Design of a smart freeze-dryer*. Pharmaceutical Research, 2005. 22(4): S. 685-700, discloses the use of a manometric temperature measurement for the choice of the optimal temperature of the supporting surfaces, for the determination of the time for an end of the drying process, for an evaluation of a residual humidity in real time and for an evaluation of the transfer rates with respect to material and heat. Here, it has been acknowledged that a resistance of the dried layer of the product determined on the basis of the manometric temperature measurement is sufficiently accurate until approximately ⅔ of the whole duration of the primary drying whereas the product temperature determined by the manometric temperature measurement is usually sufficiently accurate up to the end of the primary drying if the thermal insulation being effective during the freeze drying process is sufficiently good. Here, it is possible to estimate the primary drying duration sufficiently accurate on the basis of the material transfer rates that are calculated respectively The results of the manometric temperature measurement are taken as outstanding indicator for the determination of an end of the primary drying. Furthermore, it is possible to measure the rate of the desorption of water during the secondary drying with a sufficient accuracy by a variation of the manometric temperature measurement method. At tests upon which the publication bases pressure data was recorded during the primary drying with a sampling rate of four measurement points per second in intervals of an hour or half of an hour. Here, data has been recorded during a closure of a closing flap for 25 seconds. The publication investigates influencing parameters for the reliability of the manometric temperature measurement. Here, the influence of the heterogeneity of the drying of the single vials, the volume of the chamber, the fluid which has to be removed, the progress of the primary drying, the pattern of arrangement of the vials as well as the distance of one vial from another vial and from an edge of the supporting surfaces has been proven by experiments.

Further prior art is known from US 2008/0172902 A1.

SUMMARY OF THE INVENTION

The present invention bases on the object to propose a method for the pressure-based determination of a product parameter in a freeze dryer, a freeze dryer comprising control logic for executing a method of this type as well as a software product for executing a method of this type which is in particular improved with respect to the options, the speed, the accuracy and/or the stability of the pressure-based determination of the product parameter, the options for controlling the freeze drying process and/or the interaction of the method with the freeze drying process.

The invention proposes a method by which it is possible to determine a product parameter in a freeze dryer in a pressure-based way. The product parameter is preferably a time-variant product parameter which depends on the process of the freeze drying and/or the process conditions in the freeze dryer. The product parameter to be determined is e.g. a product temperature T, an area-normalized resistance of the dried product against vapor transport $R_p$, a rate of sublimation, a heat transfer coefficient $K_v$, a transferred stream of heat, a thickness of an ice layer of the drying product and/or a thickness of the dried drying product. Within the frame of the invention the product parameter to be determined is not a specific product parameter of a specific drying product (e.g. a specific vial of a batch comprising a plurality of drying products or vials in a drying chamber of a freeze dryer) but a representative (in particular averaged or without averaging in another way determined representative) product parameter for all of the drying products or vials arranged in a drying chamber of a freeze dryer.

In the following the invention is preferably described for the determination of a product parameter being a product temperature. However, in all of the cases described in this way within the frame of the invention also any other product parameter can be determined so that the invention is not limited to the embodiment that the determined product parameter is the product temperature.

In this method at a point in time $t_{START}$ a closing element is closed. The closing element is arranged between an ice chamber wherein an ice condenser is arranged and a drying chamber wherein the drying vessels are arranged. The closing element might be a closing flap of a valve which can also be denoted as intermediate valve. With the closure of the closing element the drying chamber is closed (completely or almost within the frame of the technical options). Then, pressure values $P_1$, $P_2$, $P_3$, ... are measured in the drying chamber (at evenly or unevenly distributed points in time $t_1$, $t_2$, $t_3$, ...) in order to sense a pressure rise which results (in particular due to the sublimation). From the measured pressure values $P_1$, $P_2$, $P_3$, ... then an approximation of the product parameter (in particular of the product temperature $T_{APPROX}$) is determined.

The invention bases on the finding that according to the prior art
- a closing time which corresponds to the time span between $t_{START}$ and $t_{END}$ is fixedly given,
- during this time span a plurality of pressure values is sensed,
- after the lapse of the fixedly defined time span the closing element is again opened without already a result for the approximation of the product parameter (in particular the product temperature) being already present and
- finally the approximation of the product parameter is determined.

For one embodiment of the invention it is proposed that the point in time $t_{END}$ (and therewith the time span for which the closing element is closed) is not fixed a priori but variable: according to the invention the point in time $t_{END}$ is determined specifically for the sensed pressure values $P_1$, $P_2$, $P_3$, ... . Accordingly, for different freeze drying processes or even for the same freeze drying process dependent on the sensed pressure values different points in time $t_{END}$ and therewith differing time spans for the duration of the closure of the closing element can result. At the same time the number N of points in time at which the pressure values $P_1$, $P_2$, ... $P_N$ are measured varies for different freeze drying processes or also during one single freeze drying process. Accordingly, due to the specific determination of the point in time $t_{END}$ it is possible to specifically consider the specific conditions.

Here, preferably the point in time $t_{END}$ and an approximation of the product parameter which is considered for determining the point in time $t_{END}$ are determined before the opening of the closing element.

For one embodiment of the invention between the point in time $t_{START}$ and the point in time $t_{END}$ (so during the time span of the closure of the closing element) successively a plurality of approximations of the product parameters (in particular the product temperature $T_{APPROX,1}$, $T_{APPROX,2}$, $T_{APPROX,3}$, ...) are determined. Here, for the successively determined approximations of the product parameter an increasing number of pressure values is analyzed. If e.g. up to the point in time $t_M$ with $t_{START} < t_M < t_{END}$ pressure values $P_1$, $P_2$, ... $P_M$ are measured, it is possible to determine from these pressure values the first approximation of the product parameter (in particular the product temperature $T_{APPROX,1}$). With the measurement of the next pressure value $P_{M+1}$ at the point in time $t_{M+1}$ then the next approximation of the product parameter (in particular the product temperature $T_{APPROX,2}$) can be determined from the pressure values $P_1$, $P_2$, ... $P_{M+1}$. With every new sensed pressure value it is then possible to determine another approximation of the product parameter (in particular the product temperature) wherein then all of the pressure values considered for the previous approximations of the product parameter and additionally the new sensed pressure value are considered. Accordingly, with the increase of the number of pressure values an analyzing method for determining the approximation of the product parameter is able to work with an increased accuracy, convergence and/or security and might be based on an increased number of supporting nodes.

For one embodiment of the invention the point in time $t_{END}$ is determined in a way such that the closing element is opened when a determined approximation of the product parameter falls below or exceeds a threshold value. If the product parameter is the product temperature, the closing element is preferably opened when a threshold value for the product temperature is exceeded. For this embodiment of the invention it is possible to monitor already during the closure of the closing element if the product parameter has changed into an undesired parameter region or will change in an undesired parameter region. If on the basis of the determined approximation of the product parameter an inadmissible high or low product parameter is detected, optionally (additional to the opening of the closing element) also an intervention into the process control of the freeze drying process might occur by e.g. changing the process control in a way that the product temperature is lowered to a state protecting the drying product or, in an extreme case, also the freeze drying process is interrupted. It is also possible that with the detection that a determined approximation of the product parameter falls below and/or exceeds a threshold an entry is made into a process documentation which documents the operational parameters and the process development of the freeze drying process so that it is possible to document this critical state of a temperature which might be too high.

For one embodiment of the invention the closing element is opened when the determined approximation of the product parameter exceeds or falls below the threshold (and in some cases also the aforementioned additional measures are taken) only if an additional analysis leads to the result that it is very likely that the determined approximation of the product parameter will sufficiently correspond to the actual product parameter which might be detected on the basis of the presence of a convergence criterion for a plurality of determined approximations or the exceeding of a minimum time span for the closure of the closing element.

It is also possible that the point in time $t_{END}$ is determined in a way such that the closing element is opened when determined approximations of the product parameters fulfill a convergence criterion. For this embodiment the closing element is only closed for a time duration as actually required in order to determine an approximation of the product parameter having the required precision.

For mentioning a convergence criterion as an example for a convergence criterion, a difference (or an absolute value of the difference) of subsequently determined approximations of the product parameter can be determined. If the difference falls below a threshold it is possible to assume that the last determined approximation of the product parameter is sufficiently stable and/or the approximation to a sufficient extent corresponds to the actual product parameter so that the sensing of further pressure values is not required for increasing the accuracy of the approximation of the product parameter and it is possible to open the closing element. It is also possible that as a convergence criterion a variance or a variability of the identified product parameter is used. It is e.g. possible that the variance or a variability is already supplied as the result of an analyzing method used for determining the product parameter (in particular a linear or non-linear regression). Accordingly, in some cases it is possible to provide the variance or the variability without additional effort. As the convergence criterion it can then be analyzed if the variance or the variability is smaller than a predefined threshold. It is also possible that a plurality of convergence criteria is used and the closing element is opened if one convergence criterion is fulfilled or a plurality or all convergence criteria are fulfilled. However, it is also possible that a plurality of convergence criteria are linked with each other (e.g. by an evaluating matrix) and then compared to a threshold. Finally, it is also possible that the considered threshold depends on further process conditions or the progress of the freeze drying process.

Furthermore, it is possible that the point in time $t_{END}$ is determined in a way such that the closing element is opened when a predefined maximum time span between the point in time $t_{START}$ and the point in time $t_{END}$ has lapsed. This might e.g. be used for the purpose that there is no endless sensing of pressure values and of determinations of approximations of product parameters and the time span for closing the closing element does not become too long in the case that with the successive sensing of pressure values the determinations of the approximations of the product parameters (despite of the prolongating closure of the closing element) does not lead to the fulfilling of a convergence criterion, e.g. because a non-linear regression method for determining the approximation of the product parameter does not converge due to inadequately chosen starting values.

A particular aspect of the invention cares for the problem that for the determination of the approximation of the product parameters in some cases it is of high importance from which point in time $t_0$ measured values are used for determining the approximation of the product parameter. E.g. transitional effects might occur due to the non-vanishing time duration within which the closing element closes with a transitional cross section that in some cases becomes smaller and smaller with time. In an extreme case the transitional effects lead to the result that for a short time the pressure in the drying chamber even decreases. Only after the complete closure of the closing element in fact the system can be assumed to be closed which in some cases has to be the basis of the determination of the approximation of the product parameter. It is even possible that the time duration which is required for closing the closing element is larger than a measurement interval between the sensing of pressure values or even a plurality thereof. Here, the model equation of Pikal (see the citations mentioned above) listed in the present patent application assume a valve closing with an ideal high velocity with a vanishing small time duration for the closing of the closing element whereas in practice the time duration is finite (and in some cases also considerable). On the other hand also by a closing element closing too fast pressure oscillations might be induced which lead to undesired transitional effects. In order to be able to automatically determine from the pressure values when the aforementioned transitional effects have ended or do not have a significant influence on the determination of the approximation of the product parameter it is proposed that in a method step a point in time $t_i$ is determined at which a sensed pressure value $P_i$ is for the first time an absolute or relative value above a pressure value $P_0$ measured before or at the beginning. The pressure value $P_0$ might be the pressure value at the beginning of the closing process of the closing element, the pressure value at the end of the closing process of the closing element or any pressure value at any point in time between the begin of the closing process and the end of the closing process, a pressure value in a predefined position in time relative to the closure of the closing element, an average value of the pressure in the temporal neighborhood of the closing element and the like. The point in time $t_i$ is accordingly determined in a way such that it is provided that already a certain rise of the pressure in the drying chamber has occurred. In order to mention a non-limiting example as the point in time $t_i$, the point in time can be chosen at which the measured pressure value $P_i$ is for the first time by a predefined percentage (e.g. at least 5% or at least 10%) above the pressure value $P_0$ measured at the start of the closure of the closing element. Here, as the relevant previously measured pressure value $P_0$ at a point in time $t_0$ e.g. the pressure value is used which has been sensed at a point in time at which the process control of the freeze dryer has caused the closure of the closing element, the closing of the closing element has been terminated or a drive element of the closing element or a sensor for the movement of the closing element signalizes that the closing element has at least partially been closed.

When the point in time $t_i$ has been determined, with pressure values $P_i$, $P_{i+1}$, . . . an approximation of a rising straight line of the pressure progression over time is determined. For the determination of this approximation of a rising straight line accordingly the aforementioned transitional effects are relevant at least to a reduced extent.

Under use of the determined approximation of the rising straight line then it is determined at which point in time $t_{INIT}$ the rising straight line approaches the pressure value $P_{INIT}$ which in particular corresponds to the pressure value $P_0$ at the beginning of the closure of the closing element. For the graphical representation of the pressure over the time this means that the point in time $t_{INIT}$ correspond to the intersection of the rising straight line with a horizontal line through the pressure value $P_0$. For the analysis then following for the determination of the approximation of the product parameter (in particular the product temperature) then only a) measured pressure values are used which have been measured at or after the point in time $t_{INIT}$ and/or b) extrapolated pressure values are used which result from the determined rising straight line (in particular an extrapolated pressure value at a point in time $t_{INIT}$ at which there is no directly measured pressure value available and/or at least one extrapolated pressure value at the points in time at which after $t_{INIT}$ pressure values have been measured under replacement of these pressure values by extrapolated pressure values), whereas pressure values that have been measured before the point in time $t_{INIT}$ are not considered for this purpose. Preferably, there is a transformation of coordinates for the measured pressure values such that the point in time $t_{INIT}$ is shifted to the point in time $t=0$.

In order to mention a non-limiting example in the following an extrapolated pressure value at the point in time $t_{INIT}$ as well as a given number K of extrapolated pressure values at the points in time of the measurements of pressure values after $t_{INIT}$ can be used, whereas thereafter only measured pressure values are used. Accordingly, the set of pressure values used for determining the approximation of the product parameter might consist of extrapolated pressure values and measured pressure values. Due to the fact that in this way disturbing transitional effects might at least partially be kept out of the determination of the approximation of the product parameter, by this embodiment of the inventive method it is possible to increase the accuracy for the determination of the approximation of the product parameter and to achieve a faster convergence as well as an increase of the stability for the determination of the approximation of the product parameter.

Generally, the approximation of the product parameter is determined under use of any model for the dependency between the product parameter and the pressure wherein besides the product parameter further parameters or operational parameters not known have to be considered and/or have to be identified which is in particular possible by use of a number of pressure values which is larger than the number of the unknown parameters to be identified. This might in some cases cause problems for a complex non-linear model with respect to the time duration for the determination of approximation of the product parameter (and the identification of the other unknown parameters) and/or with respect to the stability of the determining method for the approximation and the like. In some cases it is advantageous if single unknown parameters in the model for the modelling of the dependency of the pressure from the product parameter or starting values of the same for a non-linear regression method are already determined in another way. In advance identified unknown parameters determined in this way can then be considered in the model so that the determination of the approximation of the product parameter is eased. If unknown parameters determined in this way are used as starting values in a non-linear regression method, in this way the determination of the approximation of the product parameter with a sufficient accuracy or in a converging way can be accelerated and/or the stability of the determination of the approximation can be increased.

The pressure rise due to the closure of the closing element analyzed according to the invention for determining the product parameter on the one hand bases on the sublimation of ice from the frozen drying product. The transportation of energy is caused by the temperature difference between the supporting surface and the low temperature at the sublimation front which again results from the pressure at the sublimation front. Due to the pressure difference between the sublimation front and the chamber pressure the sublimated vapor streams (through the already dried cake) into the drying chamber. As long as there is still solvent (which might e.g. be water) present in the drying product (main drying process) this physical effect contributes the highest portion to the pressure rise which can in particular be the case at the beginning of the sublimation (e.g. up to approximately 30% of the drying progress during the main drying). This effect dominating at the beginning of the time span of the closure of the closing element will in the following also be denoted as "sublimation effect". Here, the sublimation effect is influenced by the resistance of the cake of the drying product against the (water) vapor transport through the cake. This resistance is usually described by a parameter $R_p$ which is the area-normalized resistance of the dry drying product against (water) vapor transportation. Here, the parameter $R_p$ changes dependent on the construction or build-up of the cake and the layer thickness of the cake which changes during the freeze drying process. Accordingly, also the parameter $R_p$ might be an unknown parameter which is to be identified.

Three further physical effects are superimposed to the sublimation effect:

There is a relatively fast temperature equalization via the ice layer which leads to an increase of the temperature at the sublimation front (in the following "heating effect").

Another occurring and superimposed effect is that the continuous heating of ice by the supporting surface leads to a constant pressure rise which is due to the fact that less and less heat is required for the sublimation which becomes smaller and smaller (in the following "supporting surface effect").

Finally, a remaining leakage rate of the drying chamber (which in some cases remains for technical reasons and which in some cases is small) leads to an increase of the pressure in the drying chamber which is in the following denoted as "leakage effect".

One embodiment of the inventive method takes advantage of the fact that usually at the beginning of the time span of the closure of the closing element the sublimation effect dominates which might correlate with an almost linear rise of the pressure. It is proposed that from pressure values measured at the beginning after the closure of the closing element (or after the point in time $t_{INIT}$ determined as previously explained) a linear rising straight line is determined. The inclination of the linear rising straight line correlates to the velocity of the pressure rise due to the sublimation effect. The linear rising straight line or its inclination can be determined from the measured pressure values in a lot of different ways. In the simplest case this is established by a linear regression.

Instead, with progressing time duration of the closure of the closing element the supporting surface effect and the leakage effect dominate which for sufficient high time durations (e.g. after more than 10 seconds, more than 15 seconds, more than 20 seconds and/or less than 30 seconds) lead to a linear increase of the pressure over time. For one proposal of the inventive method from the last measured pressure values a coasting straight line is determined which might e.g. also be done by use of a linear regression.

Generally, in the inventive method a non-linear regression can be used for determining a sublimation pressure of ice (which is in the following denoted as $P_{ice}$) and the area-normalized resistance of the dry product against vapor transportation $R_p$. Here, for the non-linear regression suitable starting values have to be used.

For one proposal of the invention for the non-linear progression the starting value for the sublimation pressure of ice $P_{ice,Start}$ is determined from the linear coasting straight line determined as previously explained and from the linear rising straight line determined as previously explained. Here, it is e.g. possible that the starting value for the sublimation pressure of ice $P_{ice,Start}$ corresponds to the point of intersection of the linear coasting straight line and the linear rising straight line.

For an alternative or a cumulative embodiment it is possible that in the non-linear regression the starting value for the area-normalized resistance of the dry product against vapor transportation $R_{p,Start}$ is determined by use of a model which is to be selected specifically for the product and e.g. depends on the solid body percentage in the drying product and/or the crystal structure formed during the freezing. For one model which is here chosen only as an example and which is used for aqueous saccharose solution of 5 percent by weight the modelling is provided by the following function: $R_{p,Start} = a\, L_{dry} + b$. Here, $L_{dry}$ denotes the thickness of the dried product. It is possible that for the determination of the starting value the thickness of the dried product $L_{dry}$ is set to zero or the thickness is determined from the sublimation rates of previous measurements. It is e.g. also possible that here the parameters a, b are chosen as follows:

$$a = 12000 \frac{\text{Pa s m}}{\text{kg}};$$

$$b = 50 \frac{\text{Pa s m}^2}{\text{kg}}.$$

For the non-linear regression any non-linear regression method can be used. For one proposal of the invention as the regression method a Levenberg-Marquardt-Algorithm is used which is characterized by a high robustness and stability.

One embodiment of the invention in the beginning limits the identification of the unknown parameters to the most important parameter, namely the product temperature at the sublimation front. The other parameters (as in particular the sublimation pressure of ice, the area-normalized resistance of the dried product against vapor transportation and a parameter X) will be identified only after the termination of the measurements and after the reopening of the closing element. In this way on the one hand the effort for the identification can be reduced. On the other hand it has shown that when identifying the parameters the product temperature converges in a relatively fast fashion.

Another solution of the object of the present invention is a freeze dryer. The freeze dryer comprises an electronic control unit. The control unit comprises control logic for executing a method as described before.

Another solution of the object of the invention is a software product which comprises control logic for executing the method as explained before.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

The inventive method is described in the context of the determination of a product parameter which here is a product temperature which is a temperature being representative for the temperature at the sublimation front for all of the drying products arranged in a drying chamber. In the US-American literature this product temperature is denoted as "product temperature". In the strict sense this is the equivalent temperature of the (water) vapor partial pressure at the sublimation front.

If the product temperature has been determined, by the known sublimation pressure curve (which is specifically known from the solvent used in the drying product) it is also possible to calculate the pressure $P_{ice}$ at the sublimation front from the product temperature.

However, the inventive method might also be used for the determination of another product parameter which can be identified directly or which might be determined on the basis of a previously determined product temperature (or another product parameter).

During the drying process in the drying vessel a temperature gradient establishes which in the region of the dried cake with the progression in time of the drying process converges towards the temperature of the supporting surface. At the same time the heat capacity in the drying product reduces due to the loss of water caused by the sublimation. Accordingly, a classic temperature sensor arranged in a drying vessel would sense an increasing product temperature which differs from the temperature at the sublimation front.

Figure 1:
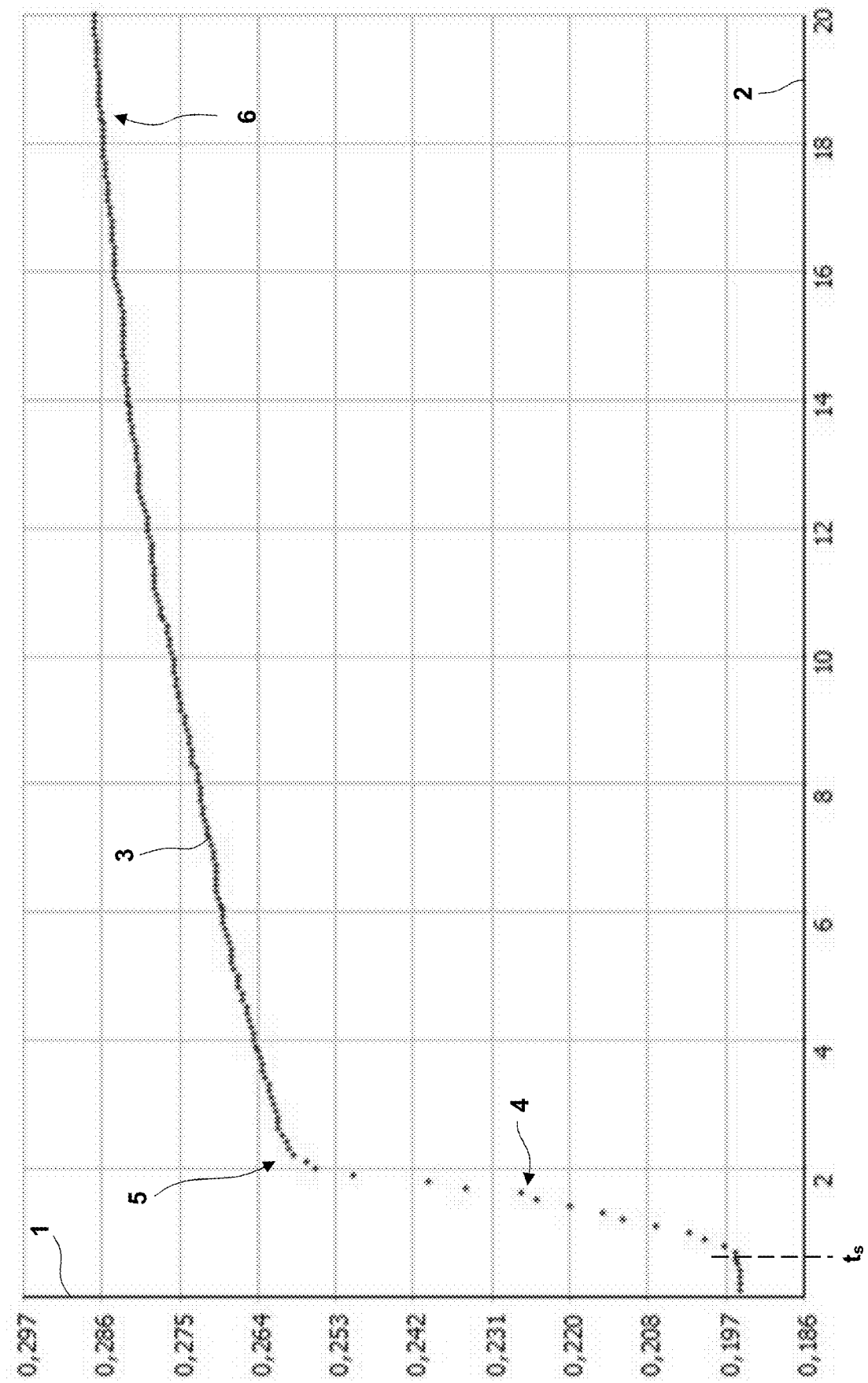
FIG. 1 shows as an example a progression of the pressure in a drying chamber over time during the main drying and closure of a closing element in the middle of the main drying.

FIG. 1 shows the progression of a pressure P 1 measured at any position in a drying chamber by a pressure sensor over the time t 2 during and after a closure of a closing element, in particular an intermediate valve arranged between the drying chamber and an ice chamber such that the drying chamber is (partially, completely or as far as possible with the reasonable technical effort) closed and sealed. The typical pressure progression 3 shown in FIG. 1 starts from a constant pressure before the point in time $t_s$ at which the valve element is closed. In fact, the closure does not take place at a discrete point in time $t_s$ but instead within a time span which is required for transferring the closing element from an opened position into the closed position. During this time span successively and according to the drive characteristic of a drive of the closing element the transition cross section between the drying chamber and the ice chamber changes so that the drying chamber is more and more closed and sealed.

The pressure progression 3 comprises directly subsequent to the closure of the closing element at a point in time $t_s$ a rising section 4 which is linear in a first approximation. In the rising section 4 the pressure changes very fast and in a first approximation linearly. This rising section 4 has a duration between 0.5 s and 2 s (in particular between 0.7 s and 1.5 s).

Via a transitional section 5 wherein the inclination of the pressure progression 3 continuously reduces for enough time the pressure progression 3 transits to a coasting section 6 wherein in a first approximation the pressure changes linearly with the time.

Figure 2:
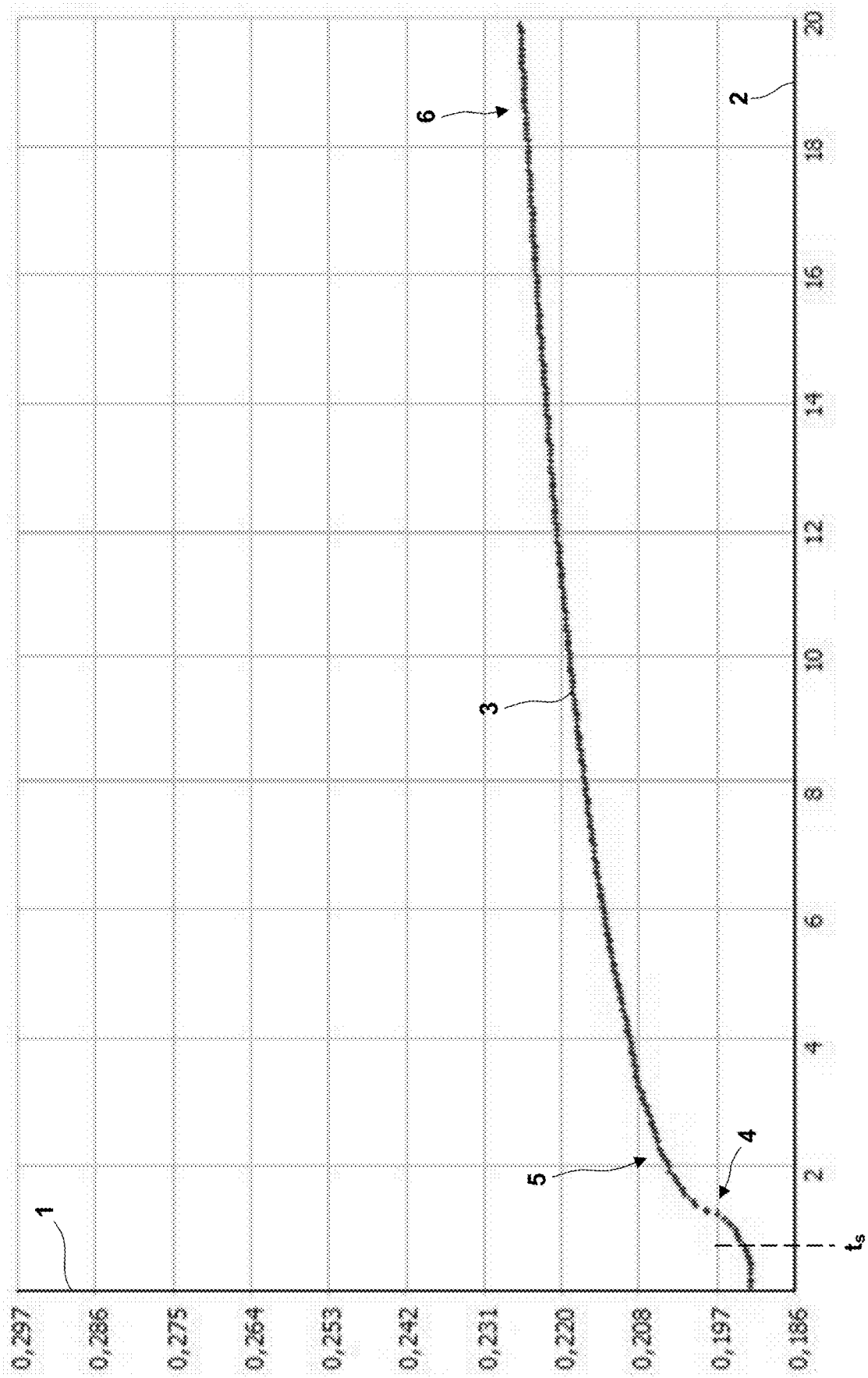
FIG. 2 shows as an example a progression of the pressure in a drying chamber over time during the main drying and closure of a closing element at the end of the main drying.

FIG. 1 shows the pressure progression 3 for a measured pressure progression with the closure of the closing element in the middle of a main drying. In FIG. 2 a corresponding pressure progression 3 is shown which typically results if the closing element is closed at the end of the main drying.

The comparison of the pressure progressions 3 of FIGS. 1 and 2 shows that the rising section 4 becomes smaller with the progress of the main drying so that a smaller pressure rise results. Furthermore, the comparison of FIGS. 1 and 2 shows that with continued time span of the main drying the inclination of the pressure progression 3 in the rising section 4 becomes smaller whereas the inclination in the coasting section 6 increases.

The pressure progression 3 is in general caused by four different physical effects, namely the sublimation effect, the heating effect, the supporting surface effect and the leakage effect (cp. the above explanations).

Figure 3:
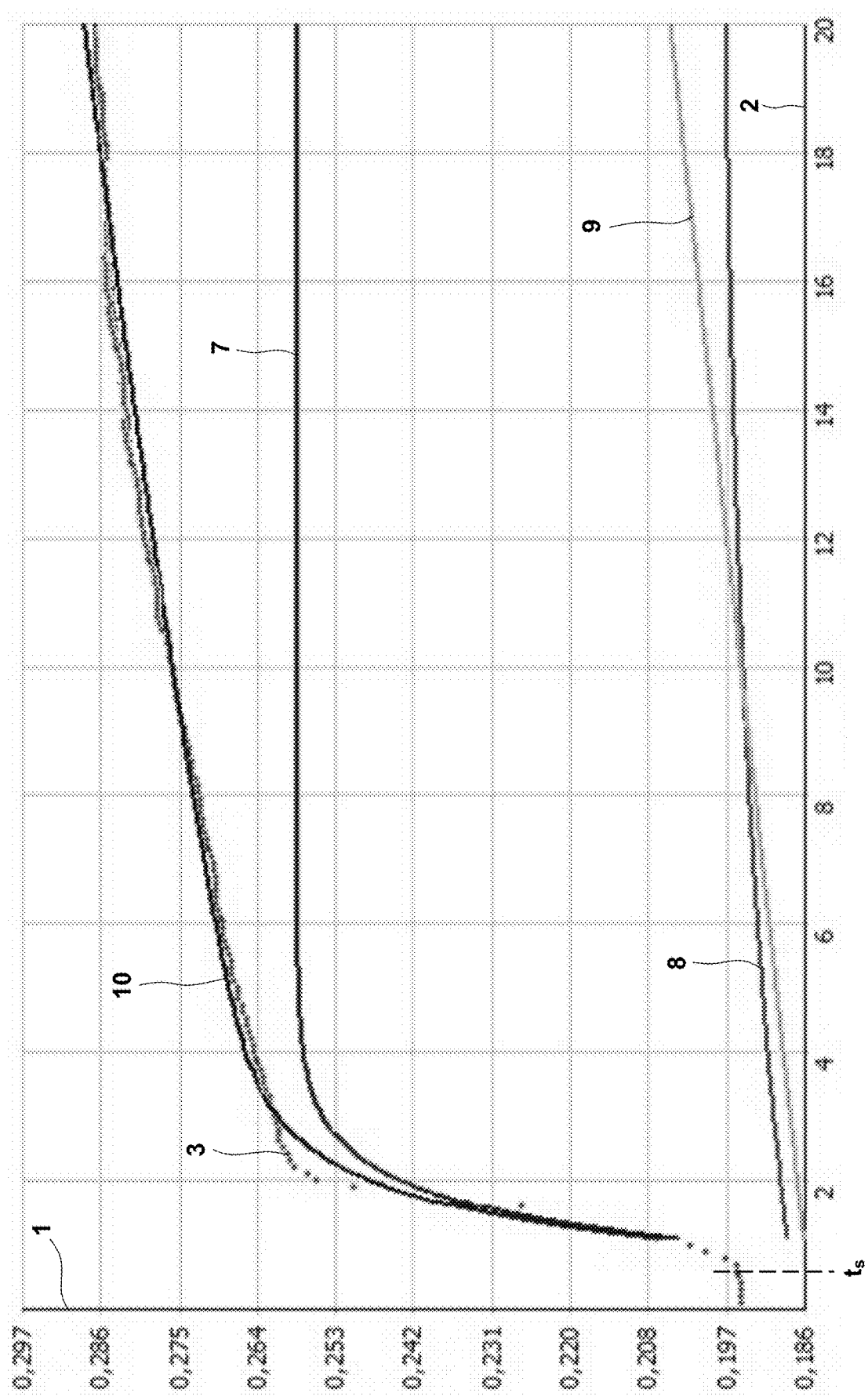
FIG. 3 shows the contributions of a sublimation effect, a heating effect, a supporting surface effect and a leakage effect to the progression of the pressure according to FIG. 1.

In FIG. 3 the different contributions of the aforementioned effects at the pressure progression 3 are shown, namely
a pressure progression portion 7 due to the sublimation effect,
a pressure progression portion 8 due to the heating effect,
as well as a pressure progression portion 9 which results from the superposition of the supporting surface effect and the leakage effect.

Furthermore, in FIG. 3 an approximated pressure progression 10 is shown which results from a superposition of the results of a modelling for the pressure progression portion 7, 8, 9 which will in the following be further explained, so from the sum of the pressure progression portions 7, 8, 9.

In FIG. 3 it can be seen that the approximated pressure progression 10 (in a sufficient distance from the point in time $t_s$) acceptably good approximates the measured pressure progression 3.

E.g. from the citations of literature mentioned in the beginning model equations for modelling the pressure progression 3 dependent on the time t during and after the closure of the closing element can be taken. Here, a model equation contains single terms which describe the sublimation effect, the heating effect and the supporting surface effect as well as the leakage effect. For the shown embodiment the model equations are non-linear and dependent on a plurality of unknowns wherein one of the unknowns is the product temperature T. For the chosen model it is possible to determine the unknowns from a measured pressure progression 3 by known mathematical methods (in particular a non-linear regression) from the model equation. Accordingly it is possible to determine also the product temperature T at the sublimation front (or the pressure $P_{ice}$ at the sublimation front).

In the following one possible physical model is presented without the inventive embodiment being restricted to this type of model:

According to the model used here the approximated pressure P(t) over time results as follows:

$$P(t) = P_{ice}(T) - \{P_{ice}(T) - P_0\}\exp\left(-\frac{N A_p R}{M V}\frac{T_v}{R_p}t\right) + \quad (1)$$

$$P_{ice}(T)\frac{\Delta H_s}{R T_{ice}^2}\frac{\Delta T_{ice}}{2}\left(1 - \frac{8}{\pi^2}\exp\left(-\frac{\lambda}{c\, l\, \rho_{ice}}\frac{\pi^2}{L_{ice}^2}t\right)\right) +$$

$$P_{ice}(T)\frac{\Delta H_s}{R T_{ice}^2}\frac{1}{c\, L_{ice}\, \rho_{ice}}K_v(T_{shelf} - T_b)t + F_{leak}t$$

with the following parameters:

| Parameter | Unit | Description |
|---|---|---|
| a) Parameters of interest/unknowns | | |
| $P_{ice}$ | Pa | sublimation pressure of the ice in the drying product |
| $R_p$ | $\dfrac{\text{Pa s m}^2}{\text{kg}}$ | area-normalized resistance of the dry drying product against the (water) vapor transportation |
| X | $\dfrac{\text{Pa}}{\text{s}}$ | constant rise due to the heating of the gas and leakage rate |

-continued

| Parameter | Unit | Description |
|---|---|---|
| b) Measured or calculated parameters | | |
| t | s | time of the measurement |
| $T_{shelf}$ | K | supporting surface temperature |
| $T_b$ | K | product temperature at the bottom of the drying vessel |
| c) System-specific parameters | | |
| V | $m^3$ | volume in the drying chamber |
| $F_{leak}$ | $\frac{Pa}{s}$ | leakage rate of the drying chamber with closed closing element |
| d) Product-specific parameters | | |
| N | | number of drying vessels |
| $A_p$ | $m^2$ | inner cross section of the drying vessel |
| e) Solvent-specific parameters, e.g. water | | |
| M = | $0.0180153 \frac{kg}{mol}$ | molecular weight of water |
| $\Delta H_s =$ | $51073 \frac{J}{mol}$ | molar sublimation enthalpy of water (at 0° C.) |
| $\lambda =$ | $2.2 \frac{J}{s\,m\,K}$ | heating conductivity of ice (at 0° C.) |
| c = | $2100 \frac{J}{kg\,K}$ | specific heat capacity of ice (at –2° C.) |
| $\rho_{ice} =$ | $918 \frac{kg}{m^3}$ | density of ice |
| $T_{ice} =$ | 253 K | temperature of ice |
| f) Constants | | |
| R = | $8.314 \frac{J}{mol\,K}$ | universal gas constant |
| g) Estimated or defined parameters (according to Milton, N.; Pikal, M. J.; Roy, M. L. et al. (1997): Evaluation of Manometric Temperature Measurement as a method of Monitoring Product Temperature During Lyophilization, PDA J. Pharma. Sci and Tech., 51, 7-16) | | |
| $T_v$ | K | temperature of the vapor (according to Tang, X.; Steven, L.; Pikal, M. (2006): Evaluation of Manometric Temperature Measurement, a Process Analytical. AAPS PharmaSciTech. the temperature of the vapor is set to equal the supporting surface temperature ($T_v = T_{shelf}$).) |
| $\Delta T_{ice} =$ | 2 K | temperature difference between the sublimation front and the bottom of the drying vessel |
| $L_{ice} =$ | 0.01 m | thickness of the frozen layer |
| l = | 0.01 m | distance from the bottom of the drying vessel (under the assumption $l = L_{ice}$) |

In the above model (1) a combination of the third and fourth term results in:

$$P(t) = P_{ice}(T) - \{P_{ice}(T) - P_0\}\exp\left(-\frac{N A_p R}{M V}\frac{T_v}{R_p}t\right) + \quad (2)$$
$$P_{ice}(T)\frac{\Delta H_s}{R T_{ice}^2}\frac{\Delta T_{ice}}{2}\left(1 - \frac{8}{\pi^2}\exp\left(-\frac{\lambda}{c l \rho_{ice}}\frac{\pi^2}{L_{ice}}t\right)\right) + X \cdot t$$

with $$X = P_{ice}(T)\frac{\Delta H_s}{R T_{ice}^2}\frac{1}{c L_{ice} \rho_{ice}}K_v(T_{shelf} - T_b) + F_{leak} \quad (3)$$

In the model the above described essential effects are described by physical approaches and simplifications for the heat transportation and the material transportation. The progress in time of the chamber pressure P(t) depends on the pressure $P_{ice}$ at the sublimation front, the coefficient of the material transfer $R_p$ and a value X. X describes the rise over time of the pressure in the drying chamber due to the leakage rate of the chamber and the heating of the product by the supplied heat. For all of the further unknowns in the model it is possible to make simplifying assumptions. Usually these unknowns are considered to be constant and/or these unknowns are estimated by help of measurements.

The considerations shown here relate to a product with the solvent water. However, the behavior would be identical for other solvents. However, for other solvents the parameters in the equation (2) being specific for the solvent have to be adapted to the corresponding material data and a corresponding equation has to be used for the sublimation pressure curve.

As a result the given equation (2) leads to the relation $P(t)=f(P_{ice}(T),R_p,X,t).$ After the closure of the closing element a plurality of measurements of the pressure P(t) is executed in the drying chamber. By suitable mathematical methods the unknown parameters $P_{ice}$, $R_p$, X are identified such that the unknown parameters as optimal as possible reproduce the progress over time of the measured pressure P(t) in the drying chamber.

An identification of the parameters in this way for the pressure progression 3 in FIG. 3 has led to the approximated pressure progression 10. As the mathematical method here a non-linear regression analysis for the searched parameters $P_{ice}$, $R_p$, X might be used. Here, it might cause problems that for the choice of inappropriate starting values the non-linear regression analysis might lead to faulty results or might not converge so that no result can be achieved. For this reason special care has to be taken for the choice of the starting values and the evaluation of the results.

After the successful determination of the pressure $P_{ice}$ at the sublimation front it is possible to calculate the temperature at the sublimation front from the known sublimation pressure curve of the solvent. Accordingly, according to the invention it is possible to determine the product temperature at the sublimation front which is important for the freeze drying process.

The method used here is also denoted as manometric or barometric temperature measurement (MTM/BTM). Here, an integral model is applied which supplies an average product temperature for all drying vessels in the drying chamber of the freeze dryer. The product temperature is not measured but calculated from the pressure progression in the drying chamber. The pressure progression in the rising section is generally defined by the sublimation of the solvent. Drying vessels which comprise a high sublimation rate at the point in time of the measurement mainly influence the pressure rise. These drying vessels are usually at the beginning of the main drying the drying vessels located at the edge of the supporting surfaces and at the end of the main drying the drying vessels located in the middle of the supporting surfaces. In the process the calculated product temperature is already defined by a comparatively small number of drying vessels that have a higher sublimation rate. Only when all of the drying vessels have a very low sublimation rate the temperature falls (cp. also the following figures with associated specification).

In some cases in practice risks for the drying product might result for the use of the described model. According to the prior art the closing element is closed for a fixedly prescribed time span and the pressure progression is measured within this time span after short time intervals. However, after the closure of the closing element the pressure in the drying chamber increases and so also the pressure at the sublimation front increases. Accordingly, corresponding to the sublimation pressure curve also the temperature of the drying product increases. In particular at the beginning of the main drying the temperature of the drying product might rise by a plurality of Kelvin. Accordingly, there is the risk that the product temperature exceeds a critical temperature and that the drying product starts to thaw which should not be the case. According to the prior art the analysis of the pressure progression can only be performed after all of the pressures sensed during the time span of the closure of the closing element are present so that the analysis is performed after the reopening of the closing element. Due to the fact that the rising of the pressure for different measurement series with respective closures of the closing element strongly changes with the progress of the drying process (at the beginning of the main drying: the rising in the rising section 4 increases more and more; during the main drying: the rising in the rising section 4 remains almost constant; at the end of the main drying the rising in the rising section 4 reduces) investigations upon which the invention relies have shown that the use of a fixed predescribed time span for closing the closing element is not optimal. The reason is that the time span might e.g. be too short for some measurement series so that it is not possible to reliably identify the parameters. Instead, for other measurement series the time span might be too long because already for a shorter time span an identification of the parameters would have been possible with a sufficient accuracy.

By use of the inventive method it is possible to specifically elect a suitable time span dependent on the sensed pressure values which on the one hand is long enough in order to provide an identification of the parameters (in particular of the product temperature) which is sufficiently accurate or converges and on the other hand is as short as possible so that the rise of the temperature is as small as possible and the thawing of the drying product and undesired adverse effects of the drying product are excluded.

According to the invention two measures are used in an alternative or accumulative fashion:

a) The calculation of the parameters is already repeated during the measurement cycle. This means that the calculation of the parameters is performed after every measurement of another pressure value or also after a given number of measurements of further pressure values. On the basis of the respective identified parameter it is possible to specifically terminate the measurement both in the case of a convergence of the parameter as well as when exceeding given maximum values and the closing element can be reopened.

b) The non-linear regression analysis is simplified by optimizations and accordingly made more robust and faster. To this in detail:

The inventive determination of the product temperature by a non-linear regression is not executed after the termination of the measurement cycle with a fixed measurement time duration and predefined time span for the closure of the closing element. Instead, already during the measurement and during the closure of the closing element the parameters are calculated from the so far present sensed pressure values. After having reached stable values for the parameters $P_{ice}$, $R_p$, X the closing element is reopened.

Figure 4:
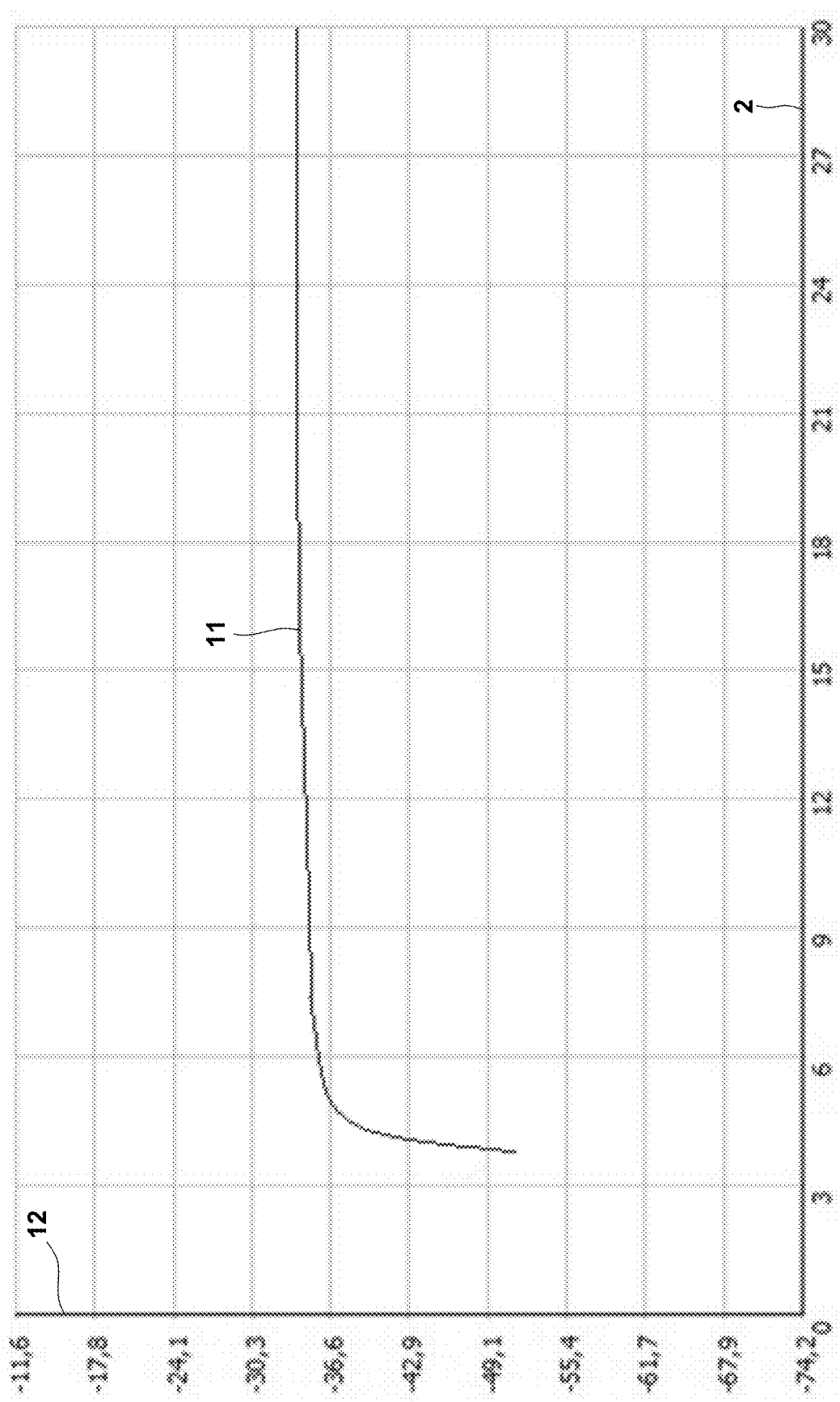
FIG. 4 shows a progression over time of a product temperature at the sublimation front during a closure of the closing element during the main drying, the product temperature being calculated from the measured pressure.

FIG. 4 shows as an example a temperature progression 11 of the identified product temperature 12 dependent on the time t 2. In FIG. 4 it can be seen that the calculated product temperature does not significantly change after a measurement duration of approximately 5 seconds so that also for a termination of the measurement and a reopening of the closing element already after approximately 5 seconds a product temperature which has been determined sufficiently accurately is present and a longer time span for the closure of the closing element is not required.

Within the frame of the invention the pressure is measured after fixedly defined time intervals which might be in the range of 20 ms to 200 ms (e.g. 50 ms to 150 ms or 80 ms to 120 ms) in order to mention only some non-limiting examples. Within these time intervals then an identification of the parameters $P_{ice}$, $R_p$, X is executed and the change of the calculated parameters is then evaluated. The measurement can be terminated and the closing element can be reopened corresponding to this evaluation e.g. if compared to a previous identification there is only a deviation of an identified parameter below a given threshold so that there is a sufficient convergence. It is also possible that a measurement is terminated and the closing element is reopened if the identified product temperature indicates that the temperature at the sublimation front exceeds a threshold value which in the worst case indicates a thawing of the ice in the drying product. It is possible that the different successively executed identifications consider the same number of measurement values of the pressure. In this case the successive identifications might use a measurement window with pressure values contained therein which is moved with the progressing time. It is also possible that for the successive identifications the same number of measurement values is selected from an increasing number of measurement values. However, preferably the successively repeated identification of the parameters considers a number of pressure values which increases corresponding to the increasing number of measured pressure values with progressing time so that the measurement windows underlying the identification increases more and more. Furthermore, an evaluation can be done on the basis of a falling below relative or absolute changes from one measurement to another measurement respectively from one identification to another identification and/or a statistical approach as a confidence interval, a standard deviation of the calculated parameter or also the change of the sum of squared errors with respect to a comparison of the calculated pressure progression on the basis of the identified parameters with the measured pressure progression.

Figure 5:
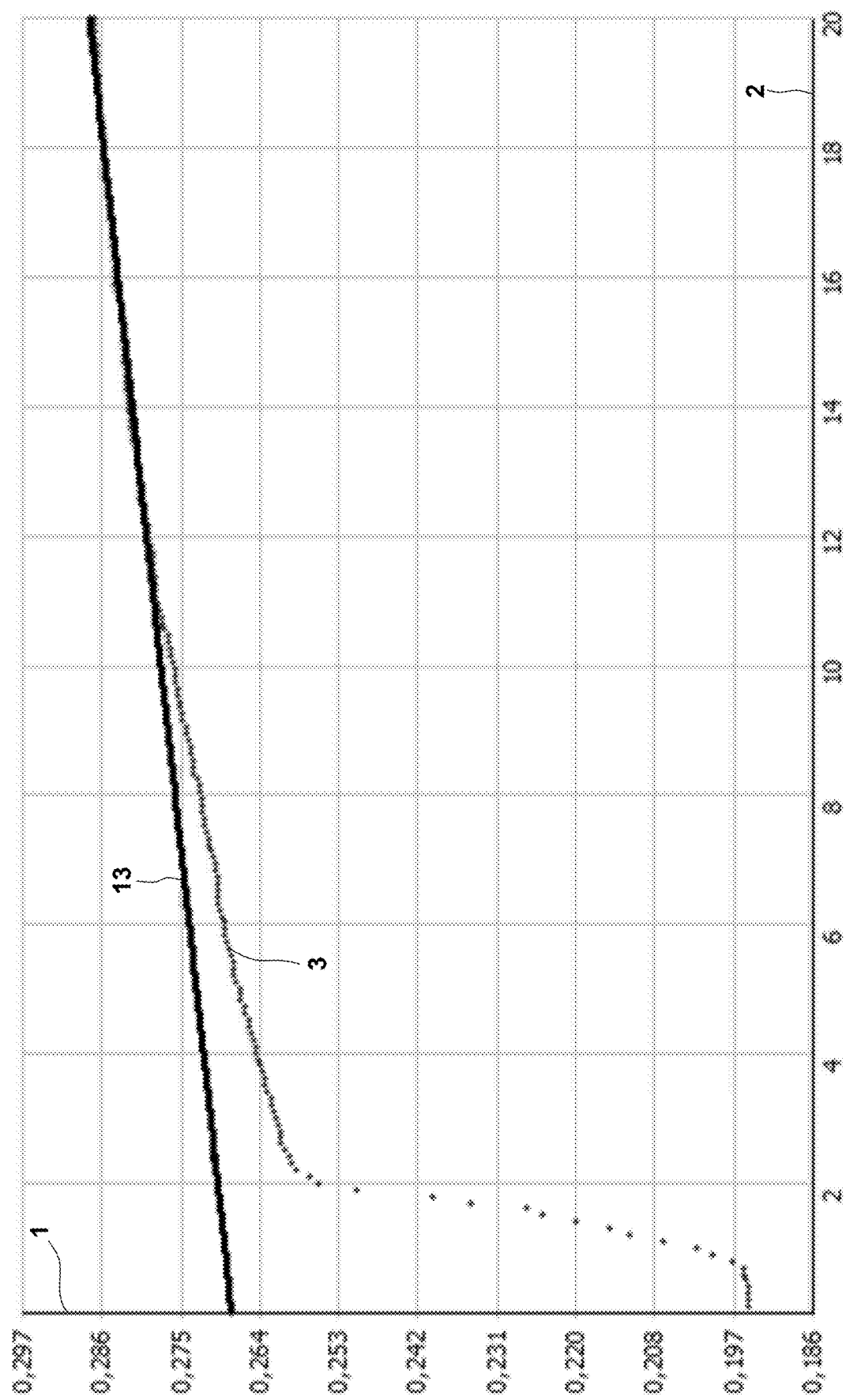
FIG. 5 shows a progression over time of the pressure of FIG. 1 with a determined linear coasting straight line which approximates the progression over time of the pressure for sufficient time after the closure of the closing element.

According to the invention another optimization can be provided by a partial linearization of the regression task. For long measurement durations and closing durations of the closing element the third summand in the equation (2) dominates so that here in a simplified approach it can be assumed that there is a linear relation between the calculated pressure and the time. This is as an example shown in FIG. 5 where the pressure P 1 is shown over the time t 2. Here, the pressure progression 3 asymptotically approaches a coasting straight line 13 which can be calculated by a linear regression. Here, the inclination of the coasting straight line 13 corresponds to the parameter X which is to be identified.

Accordingly, by a linear regression it is possible to identify a first approximation of the parameter X without for this purpose a non-linear regression being required which is complex and requires a high numeric effort and time effort.

Figure 6:
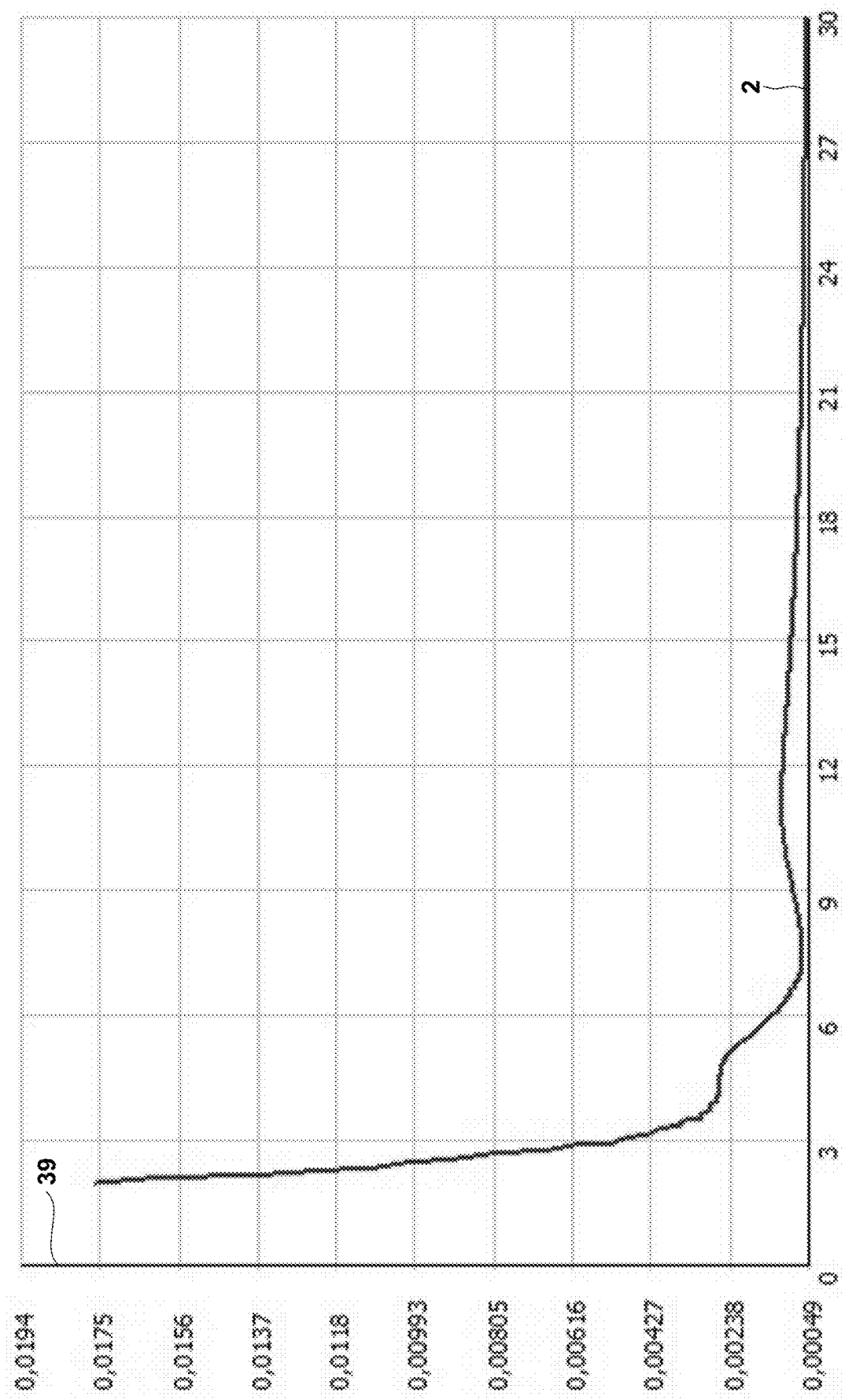
FIG. 6 shows an inclination (which correlates to a term X in (2) which is to be identified) of the coasting straight line determined according to FIG. 5, the inclination converging for increasing time duration.

FIG. 6 shows the calculated slope 39 of the coasting straight line 13 (so the parameter X in (2) which has been identified on the basis of a linear regression) with progressing time of the closure of the closing element and a successive determination of the slope 39 with the sensing of further pressure values. In FIG. 6 it can be seen that the identified parameter X approximately after 6 seconds does not significantly change so that at this point in time on the basis of the linear regression also a very good starting value for the parameter X is provided. By the starting value then also on the basis of a non-linear regression an identification of the parameters including an improved parameter X is possible and/or in some cases also after this time span it is possible to terminate the measurement and reopen the closing element.

Figure 7:
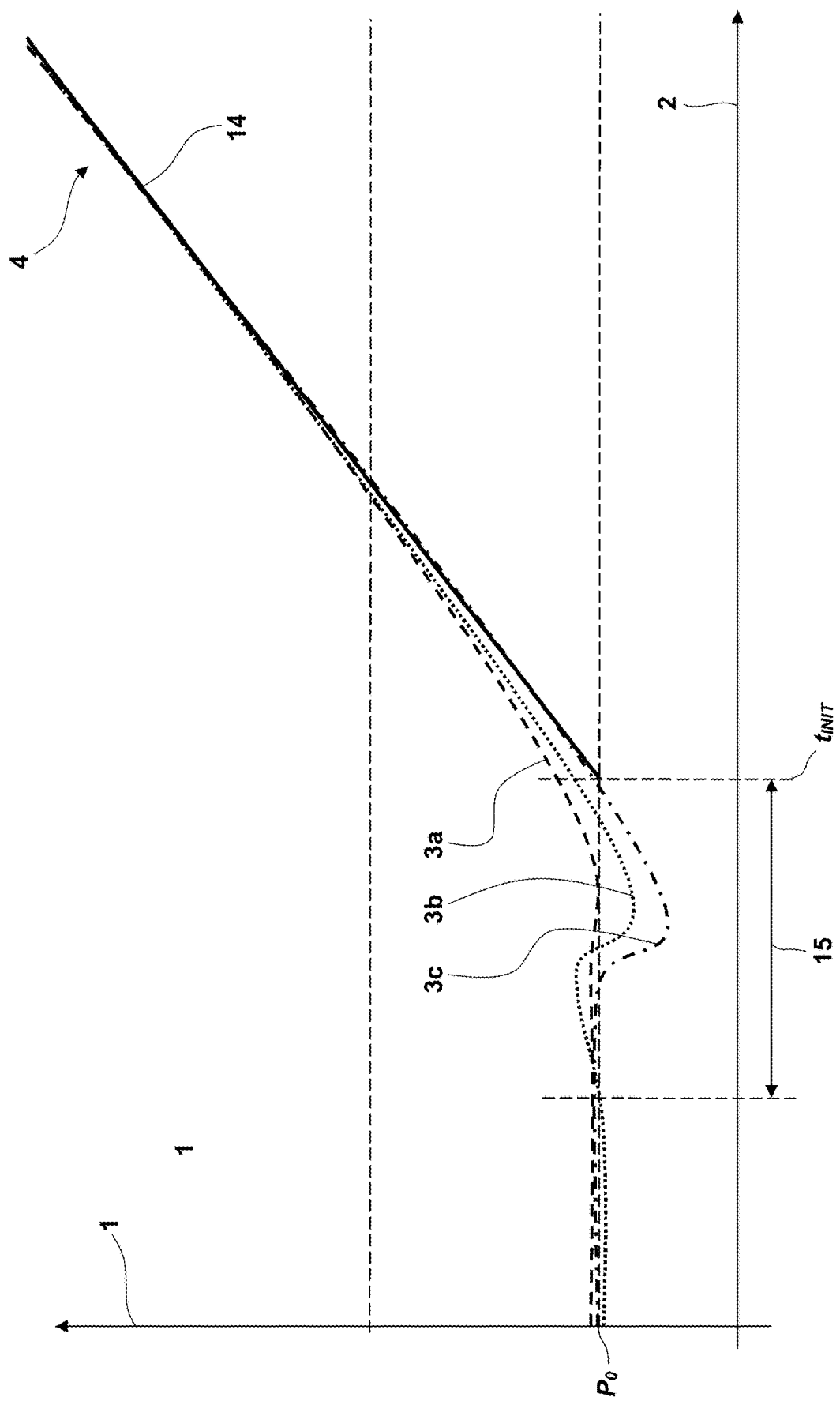
FIG. 7 shows progressions of the pressure over time due to transitional effects in the temporal neighborhood of the closure of the closing element and a determined rising straight line.

Another problem of the identification of the parameters is caused by transitional effects occurring in the temporal neighborhood of the closure of the closing element. FIG. 7 shows the pressure progression 3 in an enlarged scale and schematically in the temporal neighborhood of the closure of the closing element. Here, it can be seen that prior to the start of the closure of the closing element the pressure is constant and the pressure is $P_0$. For a sufficient long time after the complete closure of the closing element the pressure asymptotically approaches the rising section 4 of a rising straight line 14. In the transitional region 15 arranged there between pressure progressions result which cannot be described by the used models of the pressure progression (in particular cannot be described by the above described model) because common models assume that the closing element is at once closed which is technically impossible. If then for the identification of the parameters in the used model the pressure progressions with the transitional effects in the transitional section 15 are used for the identification of the parameters, this leads to a falsification of the identification or also to a degraded convergence of the results of the regression.

FIG. 7 shows a rising straight line 14 in the rising section 4 of the pressure progression 3 which has been determined on the basis of a linear regression. Here, the linear regression is only able to consider pressure values which have been taken after the point in time is of the closure of the closing element or also a given time span after this point in time. It is also possible that only pressure values are used being by an absolute or relative value above the starting pressure $P_0$ before the closure of the closing element in the rising region 4. Furthermore, a linear regression for identifying the rising straight line 14 might be performed as long as a sufficient convergence of the identified parameters of the rising straight line 14 results.

With a rising straight line 14 identified in this way then according to FIG. 7 an extrapolation of the rising straight line 14 is performed with the determination of the point in time $t_{INIT}$ at which the rising straight line 14 meets the starting pressure $P_0$. For the subsequent identification of the parameters then only measured pressure values are used which have been sensed after the determined point in time $t_{INIT}$. In this way pressure values in the transitional section 15 which might impede or falsify the identification are excluded from the identification. Optionally it is also possible that in the rising section 4 after the point in time $t_{INIT}$ the measured pressure values are replaced by the corresponding values of the rising straight line 14 which might at least be the case for a given time span after the point in time $t_{INIT}$. Alternatively or accumulatively it is possible that for the identification also a pressure value at the point in time $t_{INIT}$ is used which has been determined from the rising straight line 14. Preferably after the determination of the point in time $t_{INIT}$ a transformation of coordinates is performed such that the point in time $t_{INIT}$ is shifted to the origin of the coordinate system so that all time values are shifted by the value of $t_{INIT}$ whereas the associated pressure values remain unchanged.

Figure 8:
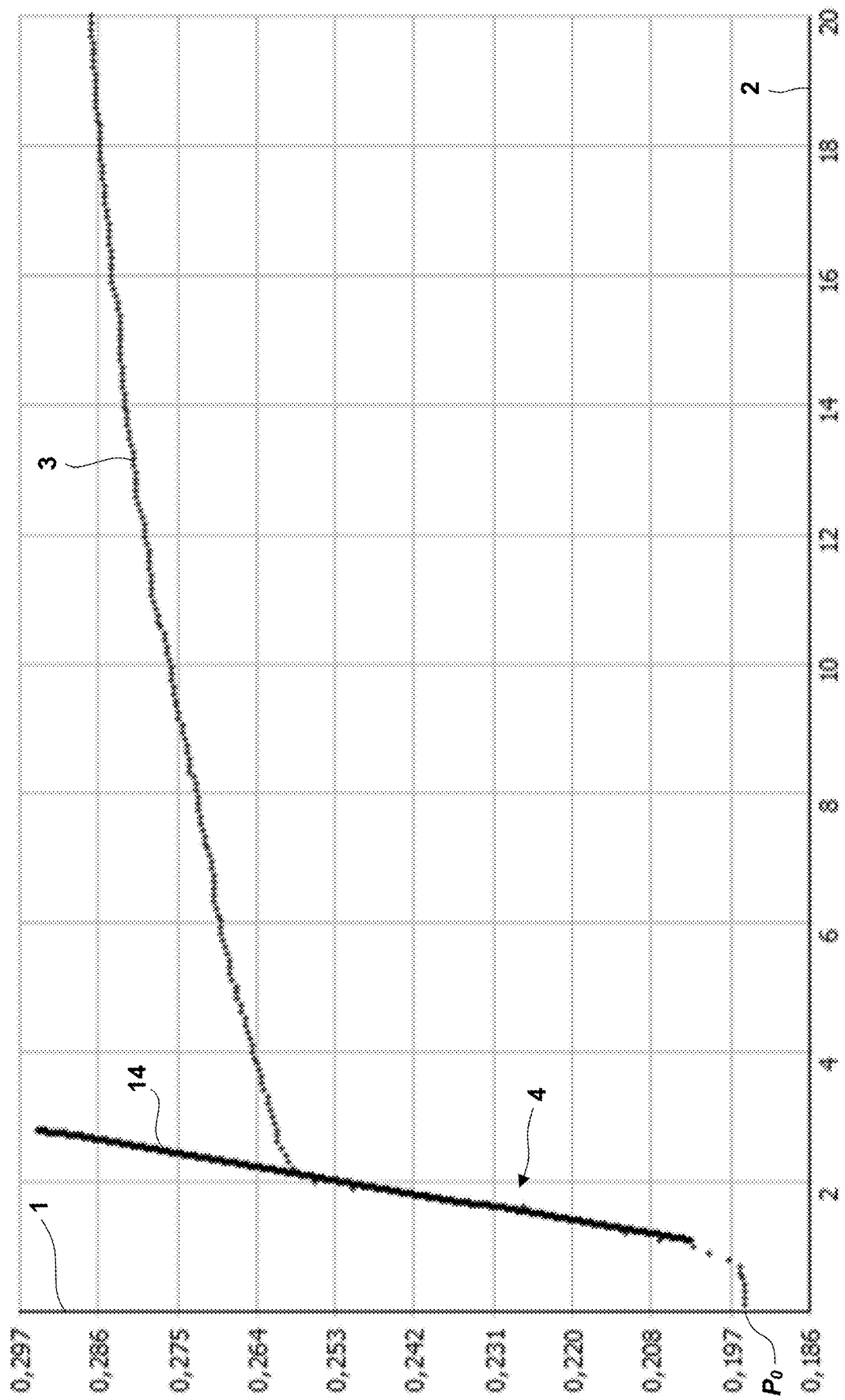
FIG. 8 shows a determined rising straight line which approximates the pressure progression for the closure of the closing element at or immediately after the closure of the closing element.

As can be seen in FIG. 8 the determined rising straight line 14 sufficiently well describes the rising section 4 of the pressure progression 3.

Figure 9:
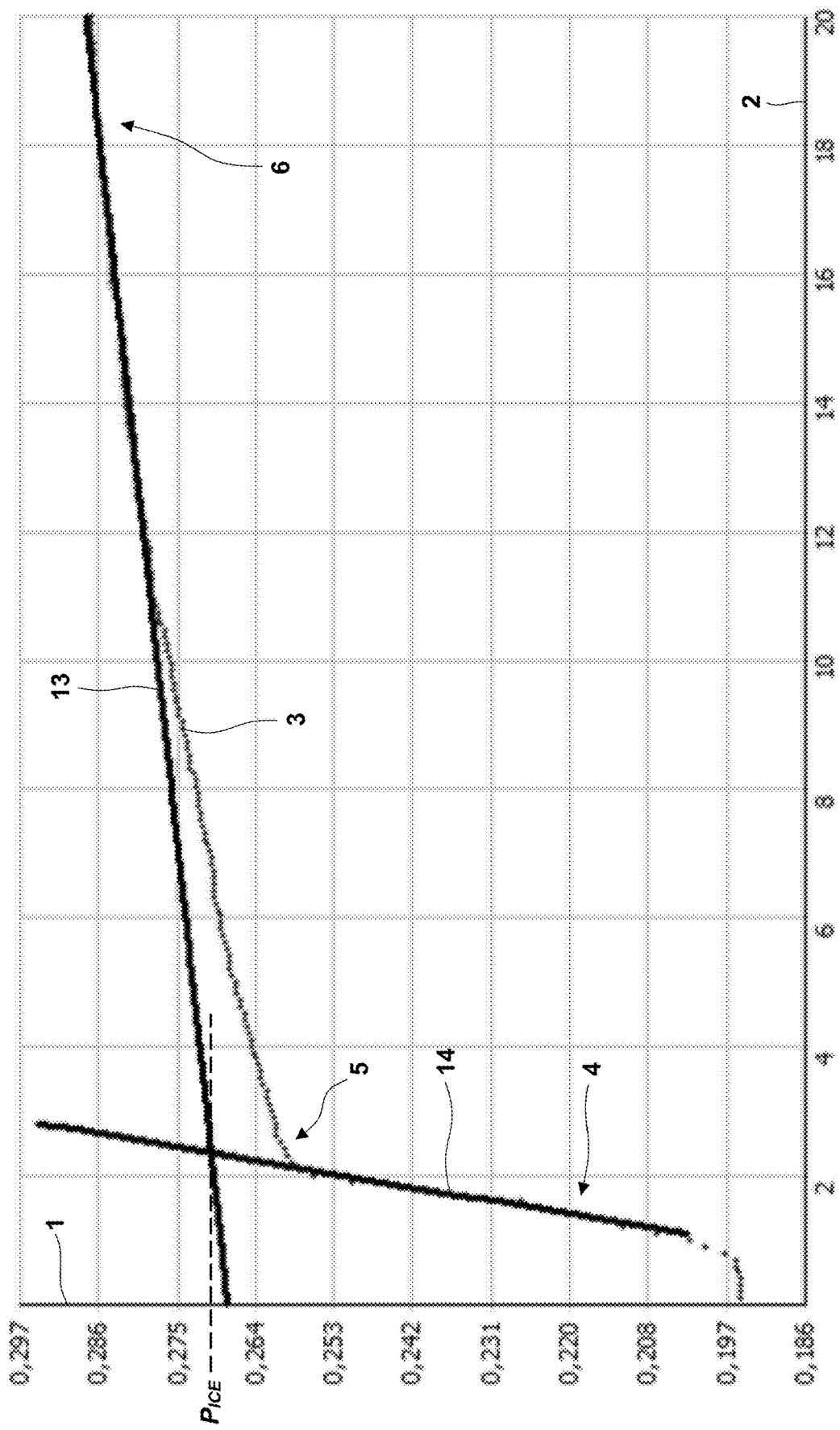
FIG. 9 shows a determination of an approximation of a sublimation pressure of ice ($P_{ice}$) from the rising straight line of FIG. 8 and the coasting straight line of FIG. 5.

Within the frame of the invention alternatively or accumulatively it is proposed that a starting value of a non-linear regression for $P_{ice}$ or the parameter $P_{ice}$ itself is determined on the basis of the point of intersection of the rising straight line 14 with the coasting straight line 13 (cp. FIG. 9). In this way then also directly a starting value for the product temperature is identified.

In some cases within the frame of the invention there is an identification of the pressure at the sublimation front $P_{ice}$ (and so also an identification of the product temperature and the searched parameter X) only on the basis of a linear regression by use of the slope of the coasting straight line 13 as well as the point of intersection of the coasting straight line 13 with the rising straight line 14 or in a corresponding way a starting value for the non-linear regression can be found. Here, by a partial linearization and the setting of a reasonable starting value for the searched pressure at the sublimation front the non-linear regression analysis might become considerably more robust and might deliver more reliable results.

The used model might on the one hand comprise two different exponential functions and on the other hand comprise a linear component. This might have the consequence that by use of a bad starting value for the parameter for the mass transfer $R_p$ which has to be determined the identification of the non-linear regression does not converge and might in some cases be terminated. For this reason one embodiment of the invention proposes that as the last value the starting value for the parameter $R_p$ is calculated which (besides a reduction of the iterations which have been previously executed) leads to the result that the correct minimum of the non-linear regression is found on the basis of a stable method.

Figure 10:
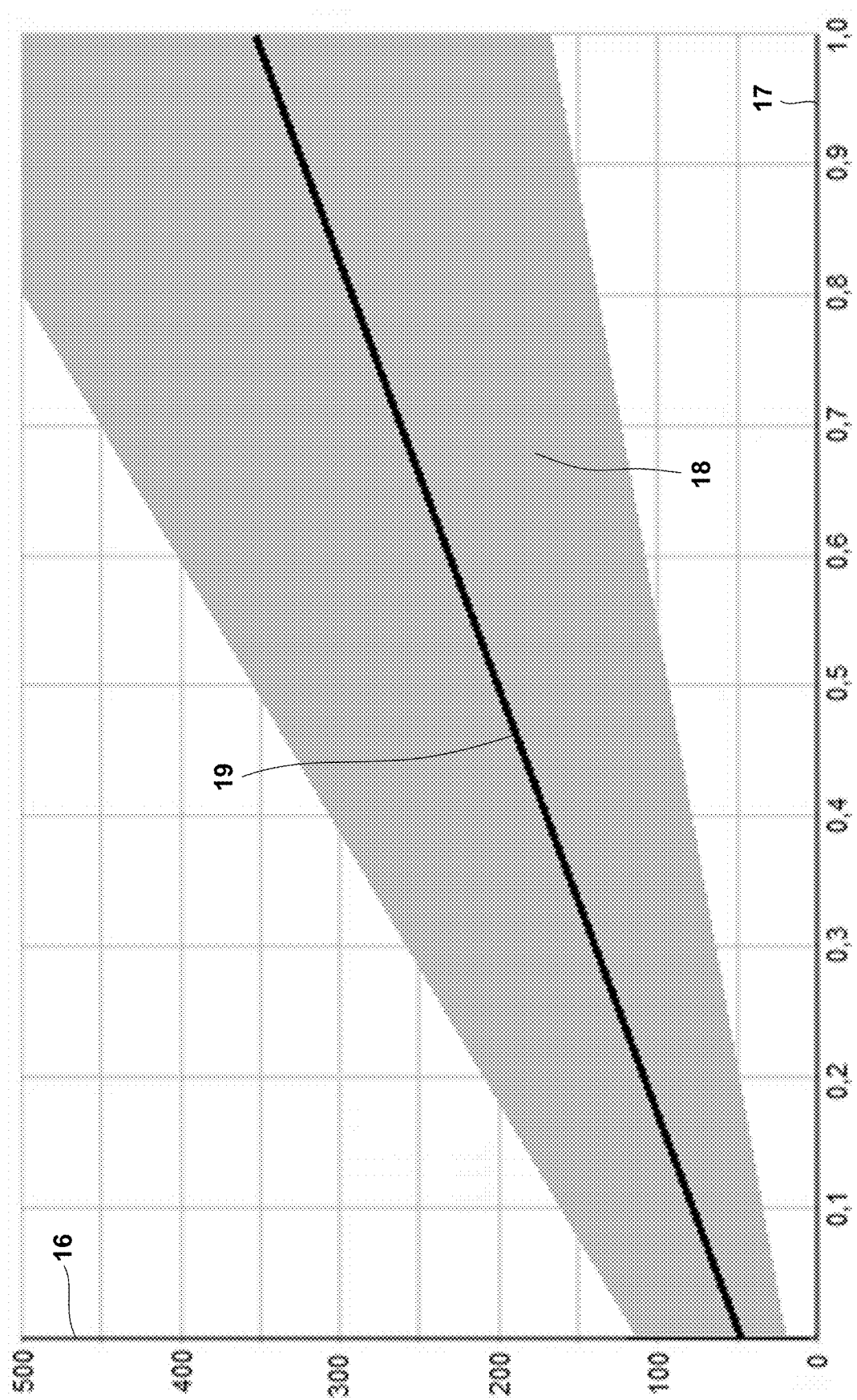
FIG. 10 shows as an example for an aqueous saccharose solvent with 5 percent per weight a region of the area-normalized resistance of the dry product against (water) vapor transportation ($R_p$) in dependence on the thickness of the dried drying product respectively cake.

For the model chosen here as an example which is used for an aqueous saccharose solvent of 5% per mass the values of $R_p$ given in the literature in dependence on the thickness of the dried product are in the range which is shown graphically in FIG. 10. Here, the parameter $R_p$ 16 is shown as a function of the thickness $L_{dry}$ 17. A modelling of $R_p$ is possible as follows:

$$R = aL_{dry} + b \quad (4)$$

with the following parameters:

a) Searched parameters

| | | |
|---|---|---|
| $R_p$ | $\dfrac{Pa\ s\ m^2}{kg}$ | area-normalized resistance of the dry drying product against (water) vapor transportation | b) Measured or calculated parameters

| | | |
|---|---|---|
| $L_{dry} = $ | m | Thickness of the dried drying product; the thickness is in particular or set to zero or |

| c) Estimated or defined parameters | | determined from the sublimation rate which has been identified in a previous measurement. |
|---|---|---|
| a | $12000 \frac{\text{Pa s m}}{\text{kg}}$ | a and b are chosen such that the starting value of $R_p$ is in the middle of the region shown in FIG. 10. |
| b | $50 \frac{\text{Pa s m}^2}{\text{kg}}$ | |

With this model a starting value for $R_p$ in the region 18 which is shown in grey in FIG. 10 (namely corresponding to an approximating straight line 19) is chosen. It is generally possible that for the same drying product or also another drying product the above model or a different model is used.

Within the frame of the present invention an optimization of the identification can in particular be achieved by means of the following measures:

It has been found that for a reduction of the number of drying vessels in the drying chamber a less steep rising of the pressure progression in the rising section results. This finding can be considered in the way that (in particular for the non-linear regression) the number of measured pressure values and so the time span for the closure of the closing element is chosen dependent on the number of the drying vessels arranged in the drying chamber. In particular the time span for the closure of the closing element and the number of the measured pressure values are increased with a reduction of the number of the drying vessels arranged in the drying chamber. Here, it is also possible that after the filling of the freeze dryer with the drying vessels before the start of the freeze drying process a user manually transmits the number of the drying vessels arranged in the drying chamber via an input unit to the control unit or at least a classification of the number of drying vessels (e.g. "small number", "medium number" or "large number") is input which then causes an adaptation of the time span for the closure of the closing element and/or causes that an adaptation of the number of the pressure values to be measured is performed by the control unit. However, it is also possible that for an automatic loading of the freeze dryer the number of the drying vessels introduced into the drying chamber is counted and then the number of the drying vessels is considered in an automatic fashion. Furthermore, it is possible that the size of the drying vessels, their inner diameter and the like is automatically sensed or manually input.

It is also possible that with the progressing drying process the time span for the closure of the closing element and the number of the measured pressure values are increased.

Preferably, the pressure values are measured with 1 to 100 measurements per second, e.g. with 5 to 60 or 10 to 20 measurements per second.

Preferably, for the non-linear regression the above mentioned model and/or a regression-algorithm which is known as Levenberg-Marquardt-Algorithm are/is used whereas the linear components can be determined as explained by means of a linear regression.

Within the frame of the inventive method the following method steps can be executed:

It is possible that the identified parameters are evaluated with respect to the quality of the regression, e.g. confidence interval respectively standard deviation of the parameters, change of the sum of squared errors with the iteration steps and the like.

With the knowledge of the progression of the sublimation pressure $P_{ice}$ and the product resistance $R_p$ it is possible to calculate the progression of the sublimation rate:

$$\frac{dm}{dt} = N A_p \frac{P_{ice} - P_C}{R_p} \quad (5)$$

With the following parameters:

| ba) Searched parameters | | |
|---|---|---|
| $\frac{dm}{dt}$ | $\frac{\text{kg}}{\text{s}}$ | sublimation rate |
| bb) Product-specific parameters | | |
| N | | number of drying vessels |
| $A_p$ | $\text{m}^2$ | inner cross section of the drying vessel |
| bc) Measured or calculated parameter | | |
| $P_{ice}$ | Pa | sublimation pressure of ice |
| $P_C$ | Pa | process pressure during the drying phase |
| $R_P$ | $\frac{\text{Pa s m}^2}{\text{kg}}$ | area-normalized resistance of the dry drying product against (water) vapor transportation |

From the sublimation rate and the calculated product temperature it is possible to estimate the heat transfer coefficient where it is possible that the results become inaccurate due to an inhomogeneous drying progress.

$$K_v = \frac{\Delta H_s}{N A_p (T_{shelf} - T_p)} \frac{dm}{dt} \quad (6)$$

with the following parameters:

| a) Searched parameters | | |
|---|---|---|
| $K_v$ | $\frac{\text{W}}{\text{m}^2 \text{ K}}$ | heat transfer coefficient |
| b) Product-specific parameters | | |
| N | | number of drying vessels |
| $A_p$ | $\text{m}^2$ | inner cross section of a drying vessel |
| c) Measured or calculated parameters | | |
| $T_{shelf}$ | K | temperature of the supporting surfaces |
| $T_p$ | K | product temperature at the sublimation front |
| $\frac{dm}{dt}$ | $\frac{\text{kg}}{\text{s}}$ | sublimation rate |
| d) Solvent-specific parameters, e.g. water | | |
| $\Delta H_S$ | $2835000 \frac{\text{J}}{\text{kg}}$ | specific sublimation enthalpy of water (at 0° C.) |

The knowledge of the sublimation rate and the heat transfer coefficient allows an evaluation of the drying progress and an evaluation of a batch or a plurality of batches for the used glass quality of the drying vessels during a continuous comparison of the batches.

It has shown that for an inventive reduction of the parameters which have to be identified for the non-linear regression from three parameters to two parameters and the identification of suitable starting values for $P_{ice}$ and $R_p$ the non-linear regression also already after very short measurement times (e.g. <10 seconds) provides a stable approximation for the product temperature at the sublimation front of the drying product.

Figure 11:
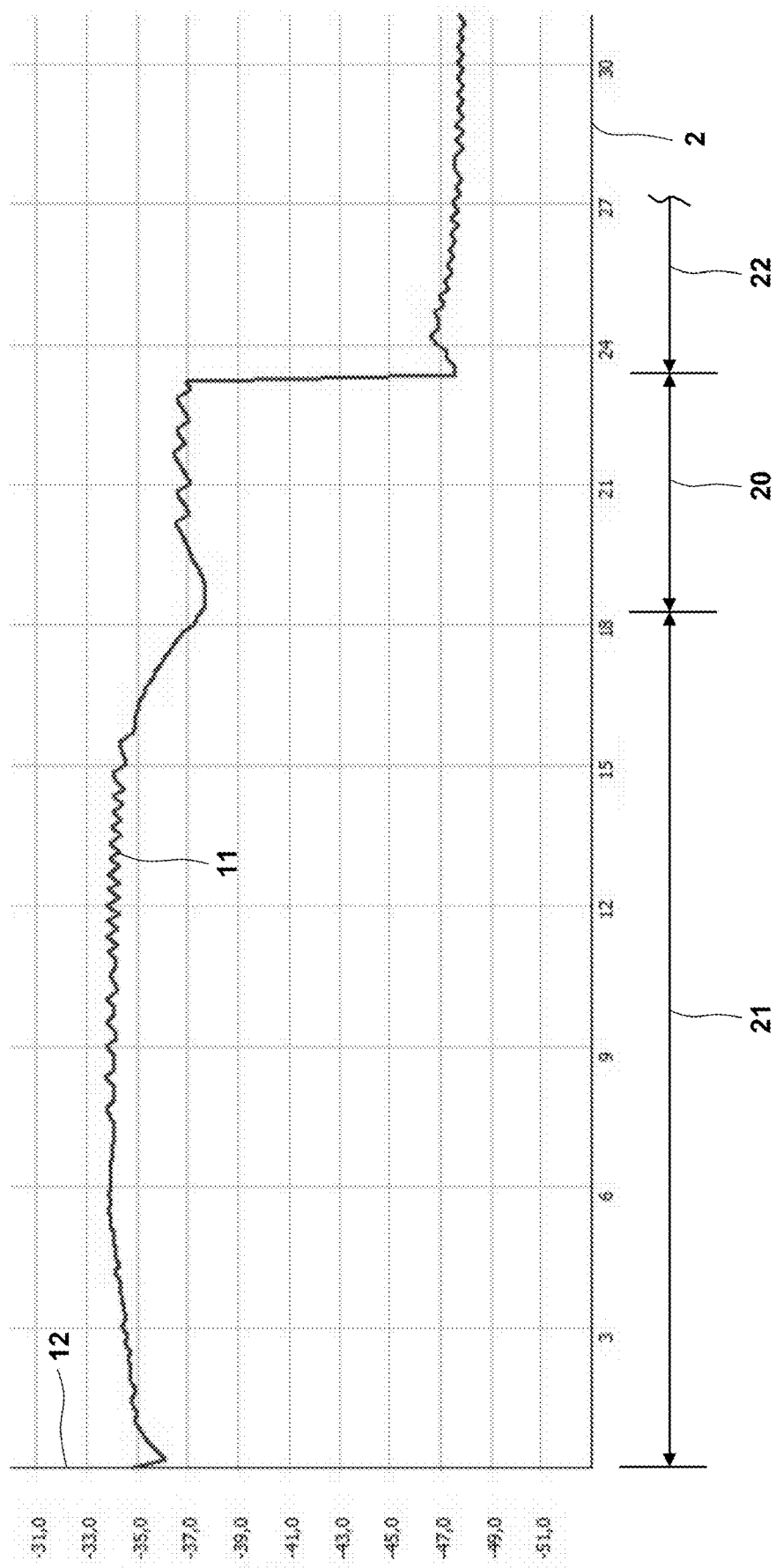
FIG. 11 shows a progression of the identified product temperature during the main drying and the post drying which have been identified from a physical model and the measured pressure values for repeated temporary closures of the closing element.

FIG. 11 shows a temperature progression 11 of the product temperature 12 identified from the pressure progressions 3 dependent on the time $t_2$ which is here shown for a plurality of hours. The product temperatures 12 of the temperature progression 11 are here again and again identified after predefined time intervals (in particular after a time span in the region of 1 to 5 min) by closure of the closing element and identification of the product temperature 12 on the basis of the method explained before. Here, it can be seen that the product temperature at the end of the main drying section 21 clearly decreases (here by at least 8 K). The product temperatures determined from the pressure progressions are accordingly also suitable for detecting the end of the main drying. For the embodiment shown in FIG. 11 the post drying 22 does not directly follow to the main drying 21.

Figure 12:
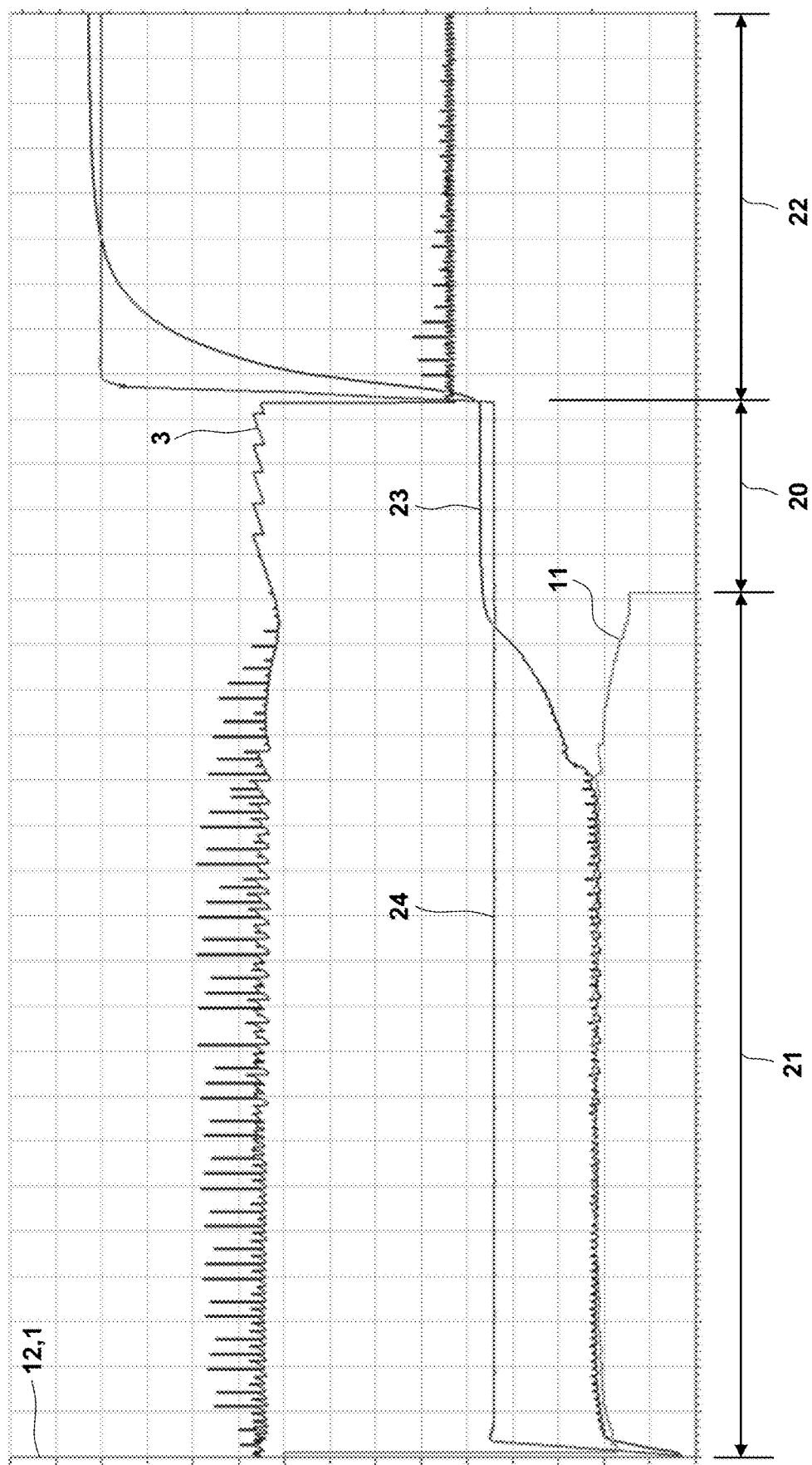
FIG. 12 shows the progressions of a supporting surface temperature over time, a product temperature measured by a sensor, a measured pressure and the product temperature calculated from the measured pressure during the main drying and the post drying.

FIG. 12 shows the temperature progression 11 of the product temperature 12 (in a representation generally corresponding to FIG. 11 and in a corresponding time interval) determined from the measured pressure progression 3 as well as a temperature progression 23 of a sensor which is arranged in a drying vessel as well as a temperature progression 24 of the temperature of a supporting surface on which drying vessels are arranged. It can clearly be seen that for a large time of the main drying the temperature progressions 11, 23 equal each other with a sufficient accuracy whereas at the end of the main drying these temperature progressions diverge. The reason for this is that the sensor arranged in the drying vessel senses the average temperature in the drying vessel including the temperature of the whole cake which at the end of the main drying more and more approximates the supporting surface temperature and so significantly increases.

Versus the end of the main drying the supporting surface effect and the leakage effect dominantly define the pressure progression during the closure of the closing element so that the pressure rise during the closure of the closing element approximates a linear progression. In this way it is possible to detect the end of the main drying On the basis of the decrease or drop of the temperature progression 11 in FIG. 12 the end of the main drying can be detected which can here also be detected on the basis that the temperature progression 23 of the temperature measured by the sensor arranged in the drying vessel corresponds to the temperature progression 24 of the temperature of the supporting surface. Also for the embodiment according to FIG. 12 the post drying 22 is not immediately started at the end of the main drying 21 by increasing the temperature of the supporting surface. Instead, the post drying 22 with the increase of the temperature of the supporting surface is initiated with a temporal offset 20.

In the pressure progression 3 according to FIG. 12 on the basis of the peaks it is possible to detect the pressure risings during the closure of the closing element. However, due to the chosen temporal resolution in some cases not all of the pressure rises are shown. Preferably, an analysis of the pressure rising at the closure of the closing element is executed every 15 to 30 minutes.

Figure 13:
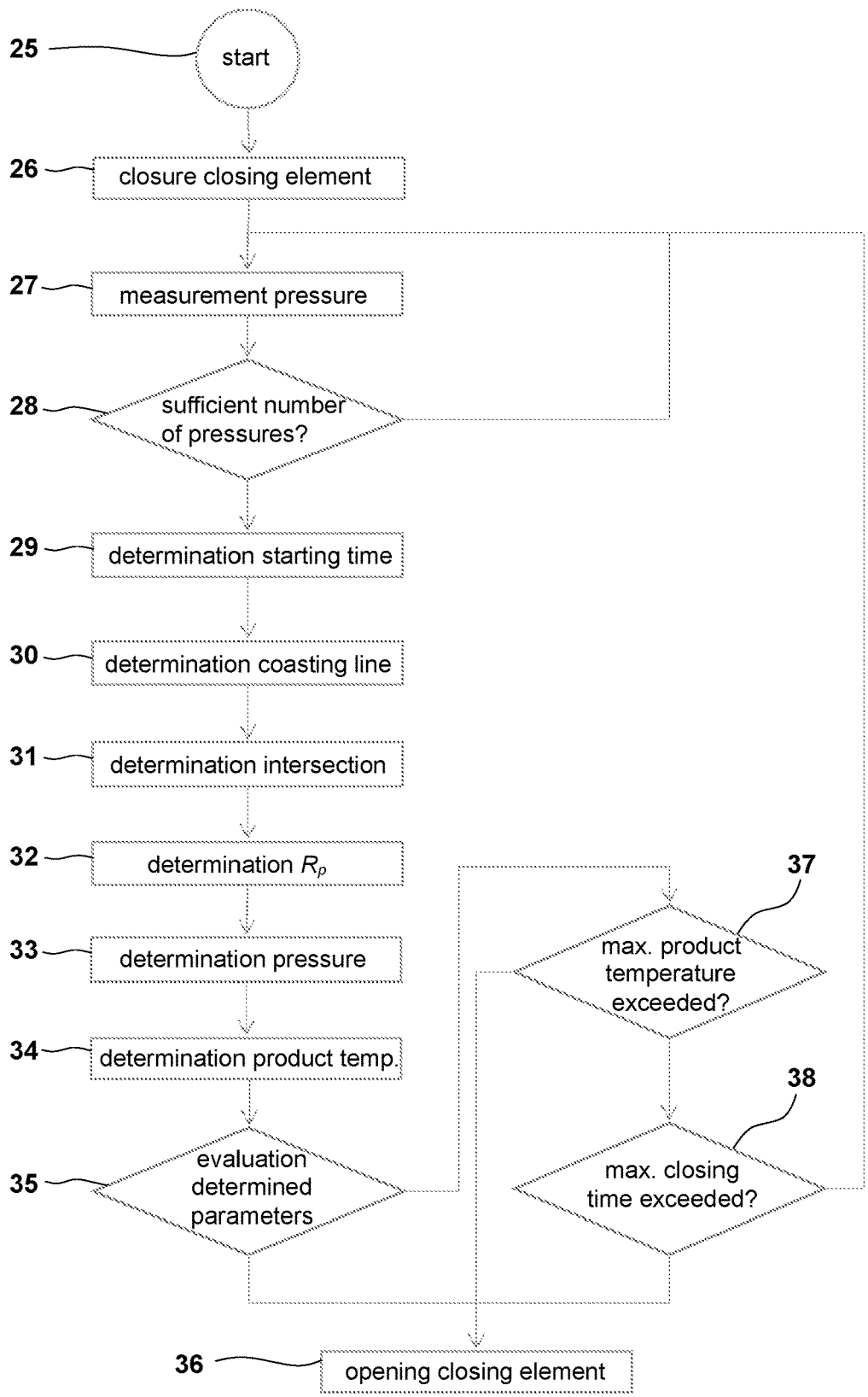
FIG. 13 shows a schematical block diagram for a method for the pressure-based determination of a product temperature in a freeze dryer.

FIG. 13 strongly schematically shows a sequence of an inventive method. The method for determining a product temperature is started during the whole drying process again and again after fixedly predefined fixed or variable time spans or also dependent on the process control in a method step 25 by the process control running in an electronic control unit.

The start of the method triggers a closure of the closing element (in particular of the intermediate valve) in a method step 26 by a drive of the closing element.

Subsequently, in a method step 27 the pressure value $P_0$ ($P_1, P_2, \ldots$) is measured. In a method step 28 it is analyzed if a sufficient number N of pressure values $P_0, P_1, \ldots P_N$ is present on the basis of which reasonably an identification of parameters can be attempted. For this purpose care has to be taken that at least also pressure values are present which are already lying on the rising section 4 of the pressure progression 3. It is e.g. possible that the decision if the number of pressure values is sufficient is made dependent on the fact that pressure values have been sensed for a predefined time span after the method step 26 with the closure of the closing elements or a predefined number N of pressure values has been sensed. It is also possible that for the analysis if a sufficient number of pressure values has been sensed it is analyzed if a measured pressure value is lying by an absolute or relative value above the pressure $P_0$ in the drying chamber prior to the closing of the closing element.

If in the method step 28 the analysis leads to the result that a sufficient number of pressure values is not present yet for a reasonable identification of parameters, the method branches back to the method step 27 so that after a fixed predefined time interval another measurement of a pressure value is executed.

However, if the analysis in the method step 28 leads to the result that pressure values are provided for which it is very likely that a reasonable identification of parameters is possible, at first in a method step 29 a starting point in time $t_{init}$ from when on pressure values should be considered is determined as explained before without an excessive influencing by transitional effects occurring. Accordingly, within the method step 29 also a linear regression for the determination of the parameters (in particular an inclination of the rising straight line 14) is performed.

In a subsequent method step 30 (also by a linear regression) as explained above the coasting straight line 13 is determined from the last measured pressure values. In this way the parameter X is identified.

In a method step 31 then (as also previously explained) by the point of intersection of the coasting straight line 13 with the rising straight line 14 a starting value for $P_{ice}$ is determined.

In a corresponding way then in a method step 32 a starting value for $R_p$ can be determined. In the method step 32 the starting value for $R_p$ is preferably calculated on the basis of equation (4).

With the starting values for $P_{ice}$ and $R_p$ determined in the method steps 31, 32 it is then possible to perform the non-linear regression in a method step 33. By means of the non-linear regression in particular the pressure at the sublimation front is determined. For the non-linear regression in method step 33 preferably a Levenberg-Marquardt-Algorithm is used. The result of the use of this algorithm might also be an information if a reliable result has been found and how this result might be evaluated.

In a method step 34 then from the determined pressure at the sublimation front the product temperature 12 is determined. In some cases in the method step 34 a product temperature is only determined if the result of the application of the Levenberg-Marquardt-Algorithm in the method step 33 was that a valid result of the identification is present.

In the method step 34 it is e.g. possible that the product temperature is determined under use of the vapor pressure curve according to the equations as these are described in Buck, A. L. (1981). *New equations for computing vapor pressure and enhancement factor*. National Center for Atmospheric Research;
Buck, A. L. (1996). *Buck Research Manual (updated equation)*. National Center for Atmospheric Research
in the form of $$e_w = 6.1121 \, e^{\frac{17.502 \, t}{240.97+t}}$$

with
  t in [° C.] and
  $e_w$ in [hPa].

In a method step 35 the identified parameters are evaluated. Here, it is e.g. possible that the fulfillment of a convergence criterion is analyzed on the basis of which it is possible to decide if the determined product temperature has converged to the required extent.

If this is the case, in a method step 36 the closing element is reopened.

However, in the case of a negative result of the analysis in method step 35, in a method step 37 it is examined if the temperature determined in the method step 34 exceeds a maximum temperature.

If this is the case the method is terminated and in the method step 36 the intermediate valve is reopened. Otherwise or as an alternative to the method step 37 it is possible that in a method step 38 it is examined if without convergence of the identified product temperature a maximum closing duration of the closing element has been exceeded.

If this is the case the method is terminated and in a method step 36 the closing element is reopened. Otherwise the method branches again back to the method step 27 with a new measurement of a pressure value after a predefined time interval and the following method steps are again run through. In this way more and more pressure values are present and an increasing convergence of the parameters identified by means of the non-linear regression can be achieved.

For a successful execution of the linear and non-linear regression explained here a minimum number of pressure values is required. The minimum number of the pressure values might in some cases be input or adjusted in or for the method. E.g. a minimum number of at least 10 pressure values is chosen. For the non-linear regression the number of pressure values is less significant than the fact that the chosen pressure values cover significant sections of the pressure progression 3, namely a part of the rising section 4, a part of the transitional section 5 and a part of the coasting section 6. Also here e.g. a recording interval of 20 to 200 ms with at least 10 pressure values might be useful. For the determination of the coasting section it is e.g. possible that the last 10% of the pressure values are considered. Accordingly it is possible that for this purpose with increasing measurement duration an increasing number of pressure values is considered.

In the case that the last non-linear regression analysis has not led to a valid result, this might on the one hand be documented in the process control. On the other hand it is possible that after the termination of the identification and the short-time reopening of the closing element the closing element is again closed with a repetition of the measurement and the identification. It is also possible that by means of a counter the number of the non-linear regression analyses required for a valid result are counted.

It is also possible to examine if a successful linear regression has already been performed before and if on this basis product temperatures have been determined. If the examination leads to the result that less than a predefined number of valid results is present the measurement might be repeated.

As a threshold for a convergence of the identified product temperatures it is e.g. possible to use the criterion that for the last five pressure values the identified product temperature is within a predefined tolerance region, e.g. of ±1 K or of ±0.5 K. If this is not the case, there is no reopening of the closing element but a new measurement after the predefined time interval.

As criterion for a termination before the identification of a sufficiently converging product temperature it might also be used that the pressure in the drying chamber exceeds and/or falls below a predefined pressure value.

With respect to the design of the freeze dryer, in particular with the drying vessels or vials the supporting surfaces, the temperature control of the supporting surfaces, the drying chamber, an intermediate valve, an ice chamber and the devices as well as methods for generally controlling the process exemplary reference is made to the patents EP 2 488 808 B1 (corresponding to U.S. Pat. No. 8,820,516 B2), DE 10 2006 019 641 B4, EP 2 773 913 B1 (corresponding to US 2017/0059246 A1, US 2014,0230265 A1), the not pre-published application EP 3 093 597 A1 of the applicant as well as to freeze dryers, components of the same as well as the therein used methods shown on the website www-.martinchrist.de which are included by reference into the subject of the present application.

Preferably, the time span of the closure of the closing element is limited to less than 15 sec, in particular less than 12 sec or less than 10 sec.

In the present specification reference is in some parts made to the use of water as solvent in the drying good. In a corresponding way the inventive method might also be used for a different solvent used in the drying product. Then physical parameters associated with the different solvent have to be used.

Within the frame of the invention with the closure of the closing element the drying chamber is closed. If in the freeze dryer a vacuum pump is used, the vacuum pump is preferably connected to an ice chamber which is formed separately from the drying chamber. The vacuum pump is separated from the drying chamber by the closure of the closing element. If this is not the case, by an additional valve (or by the constructive design of the vacuum pump) care has to be taken that the drying chamber is completely closed when closing the closing element.

Figure 14:
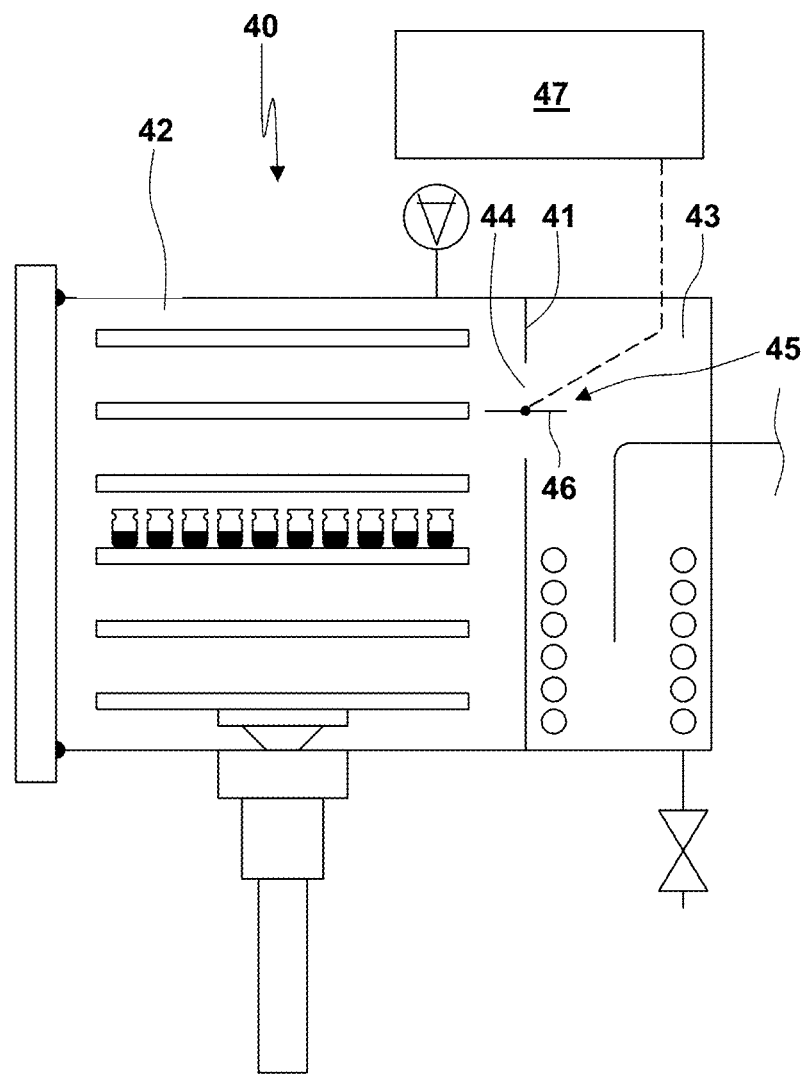
FIG. 14 schematically shows a freeze dryer with a drying chamber, an ice chamber, a valve arranged between the ice chamber and the drying chamber and an electronic control unit for controlling the valve.

FIG. 14 shows a freeze dryer 40. In the freeze dryer 40 an interior space is separated by a separating wall 41 into a drying chamber 42 and an ice chamber 43. The separating wall 41 comprises an opening 44 which fluidly connects the drying chamber 42 with the ice chamber 43. The opening 4 can be closed by a valve 45. The valve 45 comprises a closing element 46. The closing element 46 can be moved by an actuator from an open position (cp. FIG. 14) in which the drying chamber 42 is connected to the ice chamber 43 to a closed position in which the drying chamber 42 is separated from the ice chamber 43 (and vice versa). The actuator of the valve 45 is controlled by an electronic control unit 47. The electronic control unit 47 might only be used for controlling the actuator of the valve 45 and communicate with other control units being responsible for controlling the drying process. However, it is also possible that the electronic control unit 47 is both responsible for controlling the actuator of the valve 45 as well as the freeze drying process. For the shown embodiment, the drying chamber 42 is arranged besides the ice chamber 43. However, also other embodiments are possible, e.g. an arrangement of the ice chamber 43 below the drying chamber 42.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method for a pressure-based determination of a product parameter in a freeze dryer comprising an ice chamber, a drying chamber and a valve arranged between the ice chamber and the drying chamber, the valve comprising a closing element which in a closed position separates the drying chamber from the ice chamber whereas in an open position of the closing element the valve connects the drying chamber and the ice chamber, the method comprising the following method steps:
    a) moving the closing element into the closed position at a point in time $t_{START}$ and keeping the closing element in the closed position for a time span between the point in time $t_{START}$ and a point in time $t_{END}$,
    b) measuring of pressure values ($P_1, P_2, \ldots$) in the drying chamber during the time span between the point in time $t_{START}$ and the point in time $t_{END}$,
    c) determining an approximation of a product parameter from the measured pressure values ($P_1, P_2, \ldots$) measured during the time span between the point in time $t_{START}$ and the point in time $t_{END}$ and
    d) moving the closing element into the open position at the point in time $t_{END}$,
    e) wherein the determined approximation of the product parameter is considered for the determination of the point in time $t_{END}$ and
    f) the point in time $t_{END}$ and the approximation of the product parameter which is considered for the determination of the point in time $t_{END}$ are determined
       fa) during the time span between the point in time $t_{START}$ and the point in time $t_{END}$ and
       fb) specifically for pressure values ($P_1, P_2, \ldots$) measured during the time span between the point in time $t_{START}$ and the point in time $L_{END}$.

2. The method of claim 1, wherein a plurality of approximations of the product parameter is successively determined between the point in time $t_{START}$ and the point in time $t_{END}$.

3. The method of claim 2, wherein an increasing number of pressure values ($P_1, P_2, \ldots P_M; P_1, P_2, \ldots, P_{M+1}; P_1, P_2, \ldots, P_{M+2}; \ldots$) is analyzed for the successively determined approximations of the product parameter.

4. The method of claim 3, wherein the point in time $t_{END}$ is determined in a way such that the closing element is moved into the open position when a determined approximation of the product parameter falls below and/or exceeds a threshold value.

5. The method of claim 3, wherein the point in time $t_{END}$ is determined in a way such that the closing element is moved into the open position when determined approximations of the product parameter fulfill a convergence criterion.

6. The method of claim 3, wherein the point in time $t_{END}$ is determined in a way such that the closing element is moved into the open position when a predefined maximum time span between the point in time $t_{START}$ and the point in time $t_{END}$ is exceeded.

7. The method of claim 3, wherein
    a) a point in time $t_i$ is determined at which a measured pressure value $P_i$ for the first time exceeds a previously measured pressure value $P_0$ by an absolute or relative value,
    b) with pressure values $P_1, P_{i+1}, \ldots$ an approximation of a rising straight line of the pressure progression over time is determined,
    c) by use of the determined approximation of the rising straight line it is determined at which point in time $t_{INIT}$ the rising straight line approaches the pressure value $P_0$ and
    d) for the determination of an approximation of the product parameter only measured pressure values are used which have been measured at or after the point in time $t_{INIT}$.

8. The method of claim 3, wherein
    a) a point in time $t_i$ is determined at which a measured pressure value $P_i$ for the first time exceeds a previously measured pressure value $P_0$ by an absolute or relative value,
    b) with pressure values $P_1, P_{i+1}, \ldots$ an approximation of a rising straight line of the pressure progression over time is determined,
    c) by use of the determined approximation of the rising straight line it is determined at which point in time $t_{INIT}$ the rising straight line approaches the pressure value $P_0$ and
    d) for the determination of an approximation of the product parameter at least one extrapolated pressure value is used which is determined from the determined rising straight line at or after the point in time $t_{INIT}$.

9. The method of claim 7, wherein
    a) a point in time $t_i$ is determined at which a measured pressure value $P_i$ for the first time exceeds a previously measured pressure value $P_0$ by an absolute or relative value,
    b) with pressure values $P_i, P_{i+1}, \ldots$ an approximation of a rising straight line of the pressure progression over time is determined,
    c) by use of the determined approximation of the rising straight line it is determined at which point in time $t_{INIT}$ the rising straight line approaches the pressure value $P_0$ and
    d) for the determination of an approximation of the product parameter at least one extrapolated pressure value is used which is determined from the determined rising straight line at or after the point in time $t_{INIT}$.

10. The method of claim 3, wherein a linear coasting straight line is determined from the last measured pressure values ($P_{END}, P_{END-1}, \ldots$).

11. The method of claim 7, wherein a linear coasting straight line is determined from the last measured pressure values ($P_{END}, P_{END-1}, \ldots$).

12. The method of claim 11, wherein a nonlinear regression is performed for determining
    a) a sublimation pressure of ice ($P_{ice}$) and
    b) an area-normalized resistance of the dry product against transportation of vapor ($R_p$), wherein for the nonlinear regression a starting value of the sublimation pressure of ice ($P_{ice,Start}$) is determined from the linear coasting straight line and the linear rising straight line.

13. The method of claim 3, wherein a nonlinear regression is performed for determining
   a) a sublimation pressure of ice ($P_{ice}$) and
   b) an area-normalized resistance of the dry product against transportation of vapor ($R_p$), wherein for the nonlinear regression a starting value of the area-normalized resistance of the dry product against transportation of vapor ($R_{p,Start}$) is determined via $R_{p,Start} = a\, L_{dry} + b$, $L_{dry}$ being the thickness of the dried product and being set to zero or being determined from the sublimation rates of previous measurements.

14. The method of claim 12, wherein for the nonlinear regression a Levenberg-Marquardt-Algorithm is used.

15. The method of claim 13, wherein for the nonlinear regression a Levenberg-Marquardt-Algorithm is used.

16. A system of freeze dryer comprising an ice chamber, a drying chamber and a valve arranged between the ice chamber and the drying chamber, the valve comprising a closing element which in a closed position separates the drying chamber from the ice chamber whereas in an open position of the closing element the valve connects the drying chamber and the ice chamber, the freeze dryer comprising an electronic control unit with control logic for executing the method of claim 1.

17. A non-transitory, computer-readable storage medium storing instructions that when executed by a computer cause the computer to perform a control logic for a pressure-based determination of a product parameter in a freeze dryer comprising an ice chamber, a drying chamber and a valve arranged between the ice chamber and the drying chamber, the valve comprising a closing element which in a closed position separates the drying chamber from the ice chamber whereas in an open position of the closing element the valve connects the drying chamber and the ice chamber, the control logic designed to perform the following steps when executed: a) moving the closing element into the closed position at a point in time $tS_{TART}$ and keeping the closing element in the closed position for a time span between the point in time $tS_{TART}$ and a point in time $t_{END}$, b) measuring of pressure values (Pi, $P_2$, ...) in the drying chamber during the time span between the point in time $tS_{TART}$ and the point in time $t_{END}$, c) determining an approximation of a product parameter from the measured pressure values (Pi, $P_2$, ...) measured during the time span between the point in time tSTART and the point in time $t_{END}$ and d) moving the closing element into the open position at the point in time $t_{END}$, e) wherein the determined approximation of the product parameter is considered for the determination of the point in time $t_{END}$ and f) the point in time $t_{END}$ and the approximation of the product parameter which is considered for the determination of the point in time $t_{END}$ are determined fa) during the time span between the point in time $tS_{TART}$ and the point in time tEND and fb) specifically for pressure values (Pi, $P_2$, ...) measured during the time span between the point in time $tS_{TART}$ and the point in time LEND.

* * * * *